United States Patent
Hudson et al.

(10) Patent No.: US 7,580,415 B2
(45) Date of Patent: Aug. 25, 2009

(54) AGGREGATION OF HYBRID NETWORK RESOURCES OPERABLE TO SUPPORT BOTH OFFLOADED AND NON-OFFLOADED CONNECTIONS

(75) Inventors: Charles L. Hudson, Round Rock, TX (US); Prashant Modi, Pleasanton, CA (US); Daniel Nathan Cripe, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 11/116,885

(22) Filed: Apr. 27, 2005

(65) Prior Publication Data

US 2006/0248191 A1 Nov. 2, 2006

(51) Int. Cl.
*H04L 12/56* (2006.01)
(52) U.S. Cl. .............. 370/395.6; 370/389; 370/409
(58) Field of Classification Search ........... 370/229, 370/389, 409, 412, 320–235, 395.5–395.6
See application file for complete search history.

(56) References Cited

U.S. PATENT DOCUMENTS

| | | | | |
|---|---|---|---|---|
| 6,134,678 A * | 10/2000 | Mahalingam et al. | ......... | 714/48 |
| 6,941,377 B1 * | 9/2005 | Diamant et al. | ............ | 709/230 |
| 7,027,398 B2 * | 4/2006 | Fang | ........................... | 370/235 |
| 7,209,435 B1 * | 4/2007 | Kuo et al. | .................... | 370/219 |
| 7,318,107 B1 * | 1/2008 | Menon | ........................ | 709/239 |
| 2003/0041238 A1 * | 2/2003 | French et al. | ............... | 713/153 |
| 2003/0235209 A1 * | 12/2003 | Garg et al. | ................... | 370/468 |
| 2004/0030804 A1 * | 2/2004 | Wiget et al. | ................. | 709/245 |
| 2004/0215752 A1 * | 10/2004 | Satapati et al. | .............. | 709/223 |
| 2005/0063303 A1 * | 3/2005 | Samuels et al. | ............. | 370/229 |
| 2005/0080923 A1 * | 4/2005 | Elzur | ......................... | 709/238 |
| 2005/0135417 A1 * | 6/2005 | Fan et al. | ..................... | 370/469 |
| 2005/0175156 A1 * | 8/2005 | Afshar et al. | ................. | 379/35 |
| 2006/0070115 A1 * | 3/2006 | Yamada et al. | ................. | 726/3 |

* cited by examiner

*Primary Examiner*—Phuc H Tran

(57) ABSTRACT

A computer system has an aggregated plurality of hybrid network resources. The hybrid resources support both offloaded connections with a first set of clients and conventional connections with a second set of clients. The conventional and offloaded connections are established through a common physical connection to a network. A unique protocol address is assigned to each of two or more active ones of the resources. A virtual layer2 device is exported for each of the two or more active resources. The assigned protocol addresses are exposed to a protocol stack residing in the operating system of the computer system. Each of the assigned protocol addresses are exposed through and associated with the virtual device exported for the one of the active resources to which the protocol address is assigned. One or more of the conventional connections are established with the second set of clients through the active resources and their respective virtual devices.

35 Claims, 18 Drawing Sheets

US 7,580,415 B2

AGGREGATION OF HYBRID NETWORK RESOURCES OPERABLE TO SUPPORT BOTH OFFLOADED AND NON-OFFLOADED CONNECTIONS

CROSS-REFERENCE TO RELATED APPLICATIONS

The subject matter of this application is related to the following applications, which are incorporated herein in their entirety by this reference: U.S. Ser. No. 11/013,185 filed Dec. 14, 2004 and entitled "Aggregation of Network Resources Providing Offloaded Connections between Applications over a Network;" U.S. Ser. No. 11/012,510 filed Dec. 14, 2004 and entitled "Managing Connections through an Aggregation of Network Resources Providing Offloaded Connections between Applications over a Network"; and U.S. Ser. No. 11/013,138 filed Dec. 14, 2004 and entitled "Aggregation over Multiple Processing Nodes of Network Resources Providing Offloaded Connections between Applications over a Network."

BACKGROUND

Computers and other devices are commonly interconnected to facilitate communication among one another using any one of a number of available standard network architectures and any one of several corresponding and compatible network protocols. The physical nature of standard architectures and their topologies is typically dictated at the first two layers of the OSI (Open Systems Interconnection) Basic Reference Model for networks; they are known as the physical layer (layer 1) and the data link layer (layer 2). One of the most commonly deployed of such standard architectures is the Ethernet® network architecture Other types of network architectures that are less widely implemented include ARCnet, Token Ring and FDDI. Variations of the Ethernet® standard are differentiated from one another based on characteristics such as maximum throughput (i.e. the highest data transmission rate) of devices coupled to the network, the type of medium used for physically interconnecting the devices (e.g. coaxial cable, twisted pair cable, optical fibers, etc.) to the network and the maximum permissible length of the medium.

Packet switched network protocols are often employed over the physical and link layers described above. They dictate the formatting of data into packets by which data can be transmitted over the network using virtual connections established between peer applications running on devices coupled to the network. They also dictate the manner in which these virtual connections are established and torn down. These protocols are defined by layer 3 (network layer) and layer 4 (transport layer) of the OSI and typically reside in the operating system of the host computer system.

Conventionally, the operating system (O/S) of each network device executes instances of the transport and network protocols. This is sometimes referred to herein as the conventional protocol stack. Executing the transport protocol at the behest of applications local to the O/S of each device facilitates the establishment and management of virtual connections between the local applications and peer applications running on other nodes of the network (layer 4). TCP is a commonly deployed transport protocol involved in the establishment and management of such virtual connections. Executing a network protocol on behalf of applications local to the O/S of each device facilitates the formatting of payload data derived from the local applications for transmission to remote applications running on the other nodes with which the local applications are virtually connected. Executing network protocols on behalf of applications local to the O/S of each device also facilitates the extraction of payload data received from virtually connected applications running on the other nodes of the network (layer 3). IP is a commonly deployed network protocol. TCP/IP is a layer4/layer3 protocol combination commonly used in Internet applications as well as intranet applications such as local area networks (LANs).

For a conventional protocol stack as described above, data to be transmitted by a local application to a remote node with which it is virtually connected is first copied from an application buffer in the host memory to a temporary protocol buffer and it is this copy that is then formatted and transmitted by the protocol stack out over the network. Likewise, data received by the host over the network from the remote application is de-formatted and a copy of the data is then stored in a protocol buffer. An application buffer associated with the target application is then notified of the availability of the deformatted data and the data is eventually copied into the application buffer in the host memory by the O/S at the request of the destination application. As the number of network transactions and the amount of data per transaction increases, the demand on the host processor in performing the foregoing functions increases commensurately.

Network interface resources are typically required to physically couple computers and other devices to a network. These interface resources are sometimes referred to as network adapters or network interface cards (NICs). Each adapter or NIC has at least one bi-directional port through which a physical link can be provided between the network transmission medium and the processing resources of the network device. Data is communicated (as packets in the case of packet switched networks) between the virtually connected applications running on two or more network devices. The data is electronically transmitted and received through these interface resources and over the media used to physically couple the devices together. The network adapters typically provide the data link and physical layers of the interconnect standard. Adapter cards or NICs are commercially available in various product configurations that are designed to support one or more variations of standard architectures and known topologies.

Each device coupled to a network is identified by one or more "publicly" known addresses by which other devices on the network know to communicate with it. Each address corresponds to one of the layers of the OSI model and is embedded in the packets for both the source device that generated the packet as well as the destination device(s) for which the packet is intended. For Ethernet networks, a network device will use an address at layer 2 (the data link layer) known as a MAC (media access control) address to differentiate between the NICs and/or NIC ports of the other devices on the network with which it communicates. In addition, one or more protocol addresses at layer 3 (the network layer, e.g. IP, IPX, AppleTalk, etc.) are used to identify each of one or more instances of the network layer protocol(s) running on the device (for IP this is often referred to as an "IP address"). This number is also sometimes referred to as a host number when used to identify the endpoints of connections between devices on the network.

Each of the network devices can have one or more NICs/NIC ports. Each NIC/NIC port can be coupled to a different network/sub-network, or they can be teamed to operate as a single virtual NIC port that can have an aggregate throughput greater than any of the NICs/NIC ports operating individually. The teaming of NICs was motivated by the ever increasing desire for throughput between devices on networks. For a description of techniques used in support of NIC teaming to achieve increased throughput and/or fault tolerance, see for example U.S. Pat. No. 6,272,113 entitled "Network Controller System that uses Multicast Heartbeat Packets," which was issued on Aug. 7, 2001.

When operating independently, an interface is created (i.e. "exposed") to the protocol stack residing in the O/S that couples (in a virtual sense) the driver for each NIC/NIC port and the instance of IP (or other network protocol) that is part of the protocol stack. Each IP address is associated with a different NIC/NIC port or team. Each interface is typically identified by a different protocol address and packets to be transmitted and received through a particular one of the exposed interfaces carry its IP address as their source and destination IP addresses respectively. Because each interface exposed to the protocol stack is associated with its own IP address and its own NIC or team of NICs, a particular network device coupled to different networks or sub-networks (i.e. residing in different domains) will be addressed with a different protocol address. This IP address will be the one that corresponds to the NIC and interface coupling the device to the network or sub-network.

Two or more NICs/NIC ports may be teamed together to aggregate their resources, balance traffic over the team members and provide redundancy for fault tolerance. This can be accomplished by interposing an intermediate driver between the individual drivers for each NIC of the team and the instance of IP comprising the O/S protocol stack. This intermediate driver makes the multiple drivers of the team members appear as a single driver to the instance of IP, and thus only a single interface need be exposed to the protocol stack for the team. All members of the team therefore share the same IP address within a given domain.

A single NIC/NIC port or team can also be securely shared over two or more networks or sub-networks by interfacing the NIC or NIC team through a VLAN switch. Each VLAN to which the NIC or NIC team is assigned corresponds to a virtual interface to the instance of IP comprising the conventional protocol stack. As above, each virtual interface is assigned a different IP address. The VLAN switch is able to differentiate the destinations among the packets it receives from a NIC or NIC team shared among a plurality of networks through the use of a VLAN tag that is added to each frame transmitted from the shared NIC or NIC team. Packets received from the network by the shared NIC or NIC team all have the same destination MAC address and are therefore differentiated based on their destination IP addresses. Thus, the same NIC or NIC team may be shared across several VLAN subnets through a switch, while maintaining isolation between those VLAN subnets.

Each NIC or NIC port is associated with its own unique MAC address and because devices on a contiguous layer 2 Ethernet network communicate directly using these MAC addresses, they must first resolve IP addresses to MAC addresses. A network device wishing to establish a virtual connection with another peer device first consults a cache of MAC address/IP address pairs (an ARP table) that it maintains for network devices with which its has previously communicated. If no MAC address resides in the requestor's ARP table, the requestor broadcasts an ARP request to the other devices on the network that specifies the IP address of the device with which it wishes to communicate. The device identified by the IP address in the ARP request responds to the requestor by sending back the MAC address for the NIC or NIC team associated with the specified IP address. This process is known as ARP (Address Resolution Protocol), the result of which is then stored in the requestor's cache for future reference.

The MAC address can be thought of as uniquely identifying the physical hardware of the network resource (i.e. each NIC or NIC port providing a link to the network has its own unique MAC address) whereas the protocol address (e.g. IP address) identifies an interface exposed to instance of the network protocol software residing in the O/S of the host device. For a team of two or more NICs/NIC ports, the team's shared IP address is always resolved to a single MAC address (i.e. the response to an ARP on the team IP address is always the same team MAC address) so that it looks like a single physical interface to other devices on the network. This team MAC address can be any one of the MAC addresses uniquely associated with one of the individual team members. On the transmit side, the packets generated by the local applications can be transmitted through any one of the members of the team to achieve load-balancing of outgoing traffic. This is known as transmit load balancing (TLB). On the receive side, all traffic is received by the single NIC/NIC port having the team MAC address as its own.

Source and destination addresses for packets are derived during the establishment of peer-to-peer virtual connections between applications running on different network devices. The connections are defined by two (e.g. local and remote) endpoints, each endpoint designated by an IP address (or host number) and a port number. The IP address or host number for each endpoint identifies a particular interface to an instance of TCP/IP running on each of the devices between which the connection is established. The port number identifies the two applications running on each of the devices between which the data transferred over the connection is exchanged. The transport address information (i.e. host #, port #) defining each endpoint becomes the source and destination tuple or transport address within each packet transmitted over that connection. As a point of reference, the transport address for the server node is referred to herein as the destination transport address and the transport address for the client node is referred to as the source transport address.

Because there is an ever-increasing demand for maximum network performance and availability, particularly with the advent of applications such as clustered database servers and clustered applications servers, more and more data must be handled by the systems acting as servers in these types of applications. This can include the sharing of large amounts of data among the processing nodes of the cluster. The demands of such applications have motivated computer system developers to team or aggregate network interface resources such as NICs/NIC ports both to increase the data throughput rate at the network interface as well as to provide fault tolerance for improved system availability. Load-balancing the data over the teamed resources has also been employed to optimize the aggregated throughput.

Teaming network resources has led to increased data throughput at the network interface. The ever-increasing level of Central Processor Unit (CPU) performance has further improved network device performance. Notwithstanding, the overall impact of these improvements on network performance has been tempered by the fact that these improvements have significantly outpaced improvements in memory access speed. Memory access speed has become the predominant limiting factor. Additionally, an ever-increasing percentage of CPU processing capacity is now being devoted to processing network I/O transactions. As previously described, this includes both packet formatting/de-formatting operations as well as data copying operations. Thus, as the amount of data to be transferred keeps increasing, the positive impact of improved processor performance and network interface throughput is limited by the commensurate increase in the number and size of copy operations and their requisite demand on memory bandwidth.

One general approach to alleviating the memory bandwidth bottleneck and the ever-increasing demand placed generally on the processing resources of the host CPU is to establish network connections that bypass the conventional protocol stack traditionally residing in the O/S (sometimes referred to herein as the conventional or O/S protocol stack). These connections can be established over a bypass protocol stack residing outside of the host operating system to facilitate direct placement of data between the buffer memories of server and client nodes over the network. Connections that bypass the O/S based protocol stack can eliminate the aforementioned copying operations and also offload from the CPU the processing overhead normally associated with the formatting and de-formatting of such transactions. The processing capacity that can be freed up offloading these connections can be applied to other tasks such as servicing applications and users.

One set of technologies that has been developed to facilitate offloaded connections is often referred to generally as Remote Direct Memory Access (RDMA) over TCP/IP. Other technologies such as InfiniBand® also have been proposed and implemented to accomplish direct data placement (DDP), but they employ a network infrastructure that is not compatible with the existing (and widely deployed) network infrastructures such as TCP/IP over Ethernet.

Recently, the RDMA Consortium has been overseeing the development of standards by which RDMA may be implemented using TCP/IP as the upper layer protocol over Ethernet as the data link and physical layer. Various specifications for RDMA standards established by the RDMA Consortium are publicly available at www.rdmaconsortium.org. One of these technologies is a transport protocol called Sockets Direct Protocol (SDP) that extends the functionality of Sockets APIs to facilitate the establishment of both conventional TCP/IP connections as well as offloaded DDP connections. SDP emulates the semantics typically used in legacy applications written to use Sockets APIs over TCP in multiple O/S environments and therefore executes its functionality transparently with respect to legacy applications. Another such extension to Sockets API functionality is a precursor to SDP called Windows Sockets Direct (WSD) protocol, which is only available on the Windows Operating System. SDP and WSD enable legacy Sockets applications to use standard Sockets APIs such as listen, connect and accept to transparently establish offloaded connections when such connections are supported by both connecting endpoint processing nodes.

SDP and WSD are essentially libraries that intercept standard Sockets APIs and execute extended processes in response thereto to establish those offloaded connections in a manner transparent to the legacy applications. Thus, such protocol extensions enable legacy applications that speak Sockets to unwittingly set up RDMA connections between those applications when both connecting devices are configured to support them. If RDMA connections are not supported by both of the connecting nodes, the connections established between the applications running on those nodes simply default to the conventional connections established through the O/S protocol stack.

Physical connectivity to the network for offloaded connections (e.g. RDMA) is usually accomplished through a specialized network interface card often referred to as an RNIC (RDMA NIC). Each RNIC typically has its own protocol stack that includes its own instantiations of the upper layer protocols (e.g. TCP/IP), as well as the link layer and the physical layer for providing a physical RDMA link to the network. For an RNIC, direct data placement (DDP) protocols typically reside above the conventional upper layer protocols. The DDP protocols add placement information to outgoing packets over an offloaded connection to provide the RNIC at the receiving node with buffer name and location information for direct placement of the data into its buffer memory. In this way, the copy operations conventionally performed by the O/S are avoided because data is taken directly from a defined point in the application buffer for one peer application, is transmitted over the network, and then is directly placed at a defined point into the application buffer of another peer application. Likewise, the DDP protocols at the receiving end of an offloaded connection decode the placement information for direct data placement. Each RNIC also maintains connection state information for each connection established through it that facilitates communication with the user space and coordinates transfer of the data to the application that is the target of the directly placed data.

It is possible that not all devices on a particular network will be capable of supporting offloaded connections. In that case, a server may receive requests from some clients that are not properly configured to support offloaded connections and therefore seek conventional connections through the server's O/S protocol stack. Hybrid RNICs are commercially available that can present a single physical interface to the network, but provide two distinct internal pathways over which data connections may be established and through which packets transmitted over those connections may be processed. One internal pathway supports the establishment of conventional connections as previously described, while the other supports establishment of offloaded connections.

The pathway for traditional connections can provide the conventional components previously described, including NIC drivers, the software by which interfaces to the conventional O/S protocol stack are established and managed, as well as instances of an intermediate driver by which teams of NICs may be established that load-balance transmitted data and perform failover to achieve redundancy. The pathway for offloaded connections through each RNIC can include separate instances of the protocol stack and direct data placement protocols by which the offloaded connections may bypass the O/S stack as previously described. Combining the two types of traffic through the same physical interface presents significant challenges when attempting to implement failover and load-balancing of the conventional traffic, particularly when the RNICs are also teamed for purposes of aggregating their offloaded connection capacities.

BRIEF DESCRIPTION OF THE DRAWINGS

For a detailed description of embodiments of the invention, reference will now be made to the accompanying drawings in which.

DETAILED DESCRIPTION

Notation and Nomenclature

Figure 1:
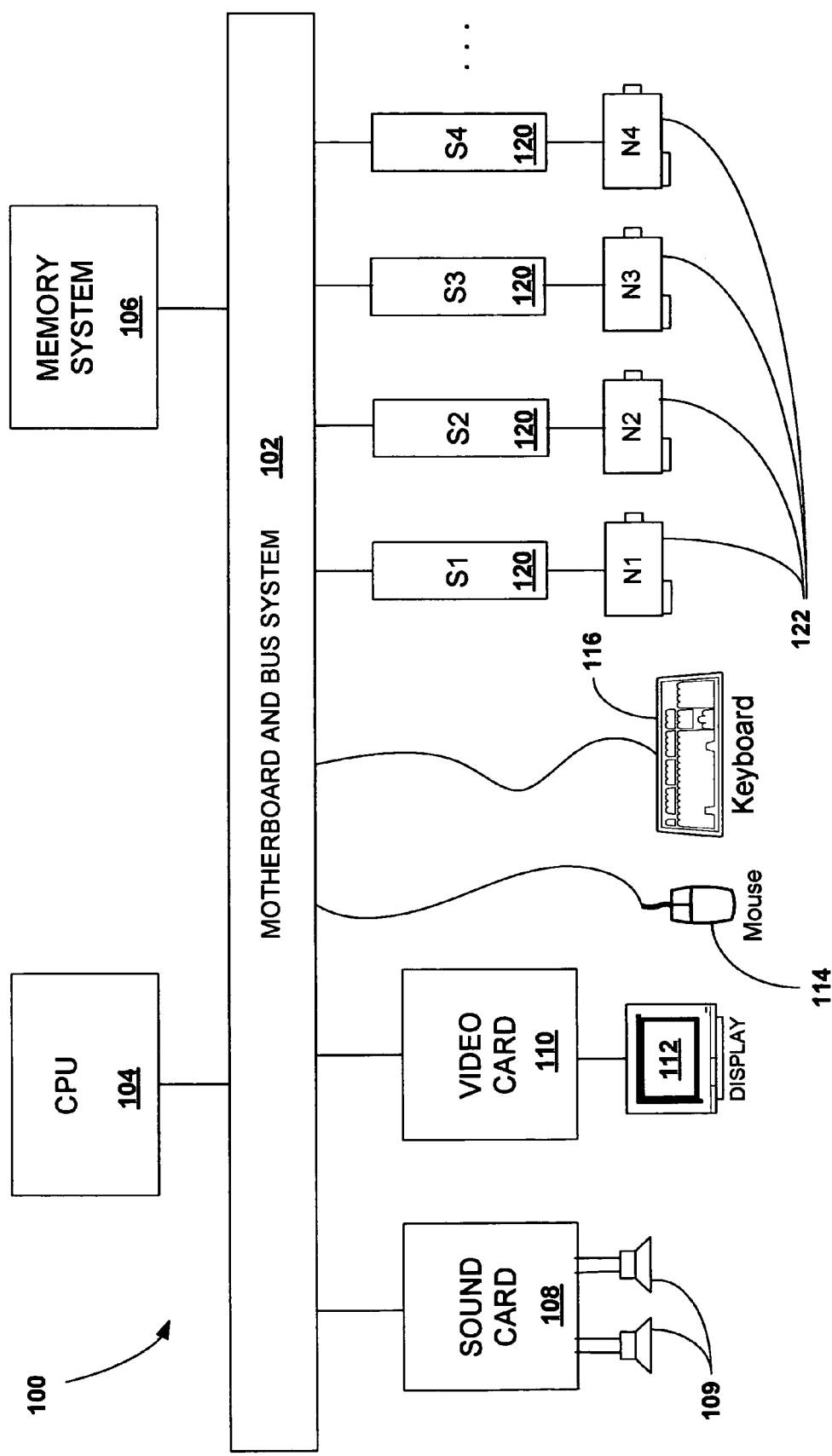
FIG. 1 is a block diagram that illustrates various features of a computer system, including some features that may be utilized to couple the computer system to a network in accordance with an embodiment of the invention.

Certain terms are used throughout the following description and in the claims to refer to particular features, apparatus, procedures, processes and actions resulting there from. For example, the term network resources is used to generally denote network interface hardware such as network interface cards (NICs and RNICs) and other forms of network adapters known to those of skill in the art. Moreover, the terms NIC and RNIC or network adapter may refer to one piece of hardware having one port or several ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . ."

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to limit the scope of the disclosure, including the claims, to that embodiment. For example, while the various embodiments may employ one type of network architecture, operating system and/or topology, those of skill in the art will recognize that the invention(s) disclosed herein may be readily applied to all other compatible network architectures and topologies.

Some devices coupled to a network such as a LAN may be equipped with resources capable of establishing offloaded connections between them. Offloaded connections can only be established over the network between devices so equipped. Because some devices on the network may not be configured with network resources that support offloaded connections, embodiments of network devices such as those performing the role of server can be equipped with network resources to support two protocol stacks: one for handling requests for offloaded connections from applications running on clients equipped to support them, and a second for handling requests for conventional connections requested by applications running on clients not configured to support offloaded connections.

Network devices such as servers that support dual protocol stacks can do so with commercially available hybrid network resources (e.g. hybrid RNICs), each providing a single physical interface with the network. Internally, the hybrid RNIC has two virtual devices each to support one of two virtual processing paths: a protocol offload device that comprises an independent offloaded protocol stack (including direct data placement protocols), which interfaces directly with the application layer of the network device to support offloaded connections; and a layer2 device for supporting conventional connections through a conventional virtual interface to the traditional protocol stack residing in the O/S of the network device. One such commercially available hybrid RNIC is the BCM5706, manufactured by Broadcom Corporation.

In the related applications cross-referenced above, embodiments are disclosed that aggregate offloaded connection capacities of multiple RNICs and provide redundancy for such connections. Embodiments of the present invention are disclosed herein that can aggregate throughput capacities of hybrid RNICs for both conventional as well as offloaded connections established therewith. Embodiments are also disclosed herein that can transmit load-balance data transmitted over the conventional connections established through the hybrid RNICs. Further embodiments are disclosed that provide hybrid NIC redundancy through failover.

FIG. 1 is a block diagram of a computer system 100 that illustrates various features of the computer system 100, including some of those features that may be used to couple it to a network in accordance with embodiments of the present invention. The computer system 100 can be an IBM-compatible, personal computer (PC) system or the like, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA (EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in PCs. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration.

The motherboard and bus system 102 are typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, each of a plurality of NIC adapter cards 122, individually labeled N1, N2, N3 and N4 is shown coupled to the respective slots S1-S4. The bus, implemented for slots 120 and the NICs 122, is typically dictated by the design of the adapter card itself. In an embodiment, the NICs 122 may be hybrid RNICs as described above.

Figure 2:
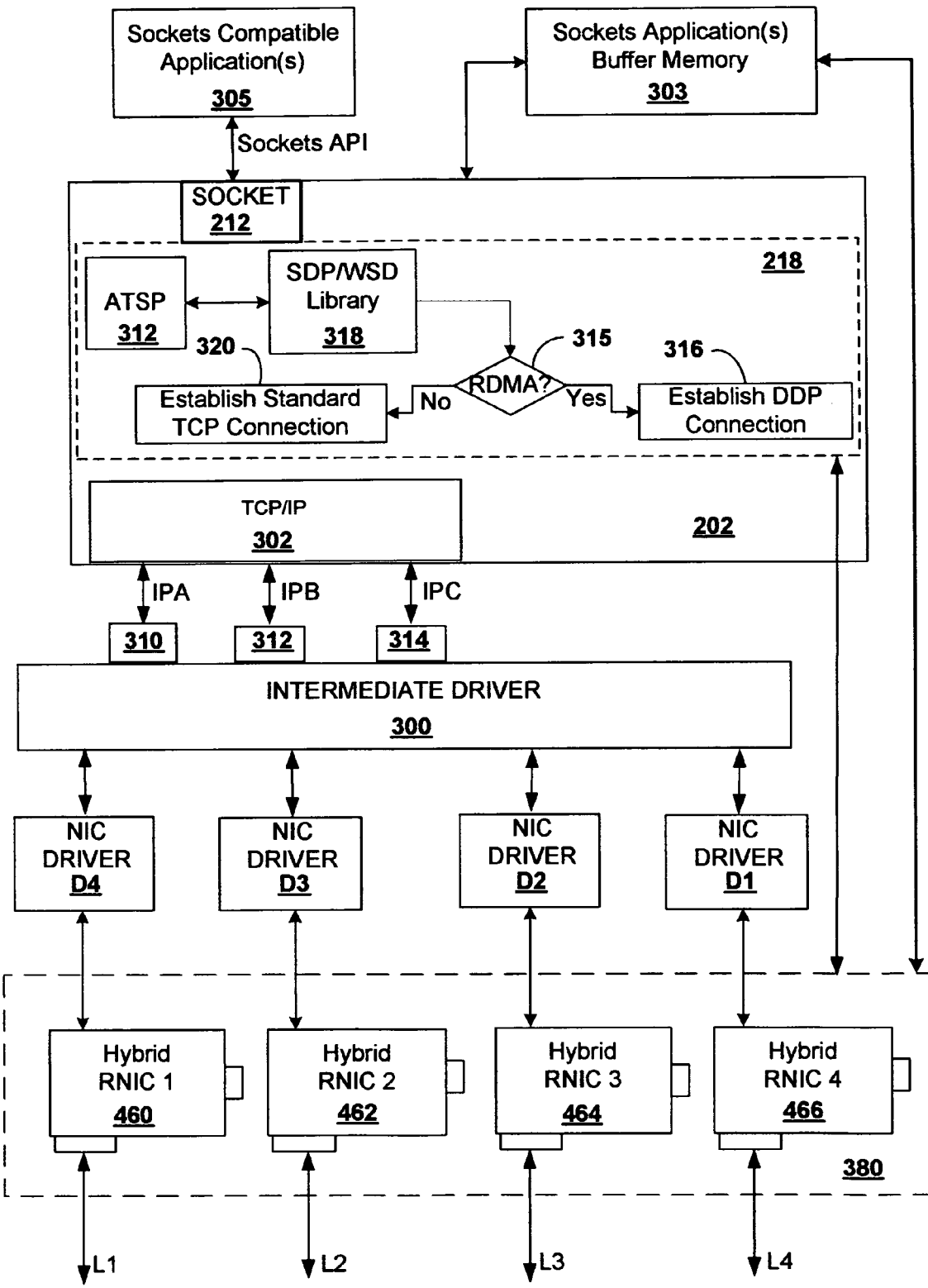
FIG. 2 is a conceptual representation of the computer system of FIG. 1 configured to support both conventional Ethernet connections as well as offloaded connections through hybrid network resources in accordance with embodiments of the invention.

FIG. 2 conceptually illustrates an embodiment of a computer system 100 (such as the one illustrated in FIG. 1) that includes a traditional stack and an offloaded stack each coupled to a network through the single physical interface of a plurality of hybrid RNICs 460, 462, 464, 466. Those of skill in the art will recognize that the plurality of hybrid RNICs is not limited to the four of the example embodiment. The traditional stack includes protocol layers TCP/IP 302 residing in the O/S 202 and supports conventional (i.e. non-offloaded) connections. Offloaded connections (e.g. RDMA/DDP) are established through TCP/IP layers (not shown) residing in each of the hybrid RNICs 460, 462, 464, 466. The connections of both types are established between application programs/services 305 running on system 100 (the local processing node) and applications running on remote client processing nodes (not shown). The remote clients can be configured similarly to the system 100 to provide both types of stacks, or they can be configured to provide only one of the stacks.

As described in detail in the cross-referenced related applications, SDP/WSD library 318 represents a library that has been developed to provide the extended functionality necessary to create offloaded connections initiated by standard APIs. The library 318 can be the Sockets Direct Protocol (SDP), the Winsock Direct Protocol (WSD) or any other equivalent thereof the execution of which facilitates establishment of offloaded connections on behalf of the applications 305.

Detailed embodiments are disclosed in the cross-referenced related applications by which the offloaded connection capacities of each of the plurality of RNICs may be aggregated. In sum, private IP addresses are internally assigned to uniquely identify each of the RNICs. The other devices on the network are initially "unaware" of these private IP addresses. To establish an offloaded connection, client applications configured to support offloaded connections themselves initiate a query to the system 100 using a public IP address associated with a virtual interface to the traditional IP stack of system 100. The query specifies this public IP address of system 100 as well as a port number associated with the server application 305 to which the client application wishes to connect. Translation mechanism 218 translates both the public address and the port number specified in the query to one or more tuples that each identifies a potential endpoint for a connection through one of the RNICs over the offloaded stack. Each of the one or more tuples includes one of the private IP addresses internally assigned to the RNICs. At least one of these tuples is then provided in a response back to the client for establishing the offloaded connection. The client then ARPs on one of the one or more translated tuples to acquire the MAC address for the RNIC assigned to the IP address of the translated tuple. For a more detailed explanation of this address translation mechanism, the reader is requested to refer to the related applications cited in the CROSS-REFERENCE TO RELATED APPLICATIONS section above.

Figure 3:
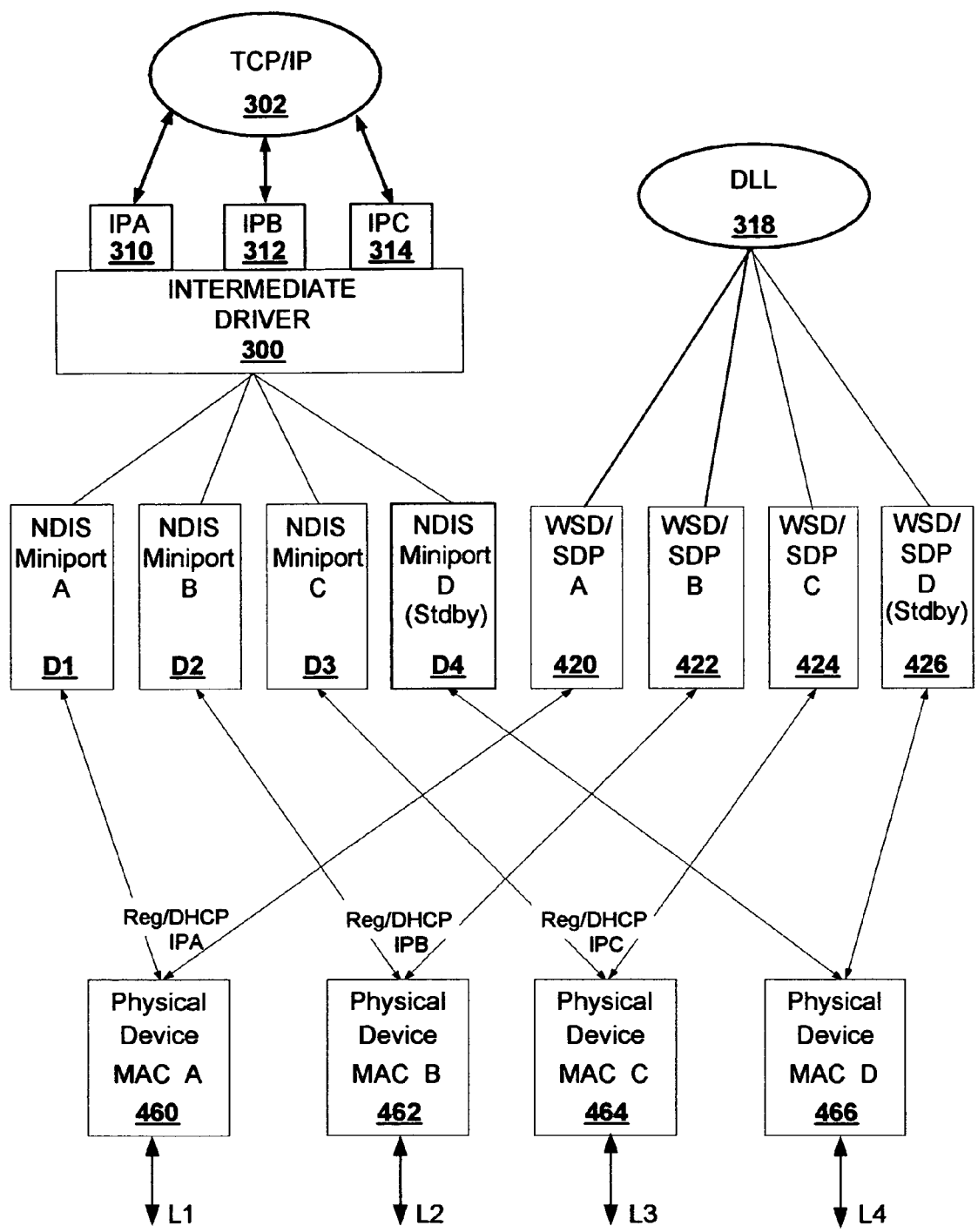
FIG. 3 is a conceptual representation of the computer system of FIGS. 1 and 2 illustrating two stacks for supporting both conventional connections as well as offloaded connections through hybrid network resources in accordance with embodiments of the invention.

FIG. 3 conceptually illustrates an embodiment of the present invention employing hybrid RNICs to provide the two stacks necessary to support both conventional and offloaded connections. The multiple hybrid RNICs are aggregated for use by both stacks. Contrary to embodiments disclosed in the cross-referenced related applications, however, the embodiments of FIGS. 2 and 3 publicly expose the IP addresses assigned to each of the hybrid RNICs to the traditional protocol stack including layers TCP/IP 302 residing in O/S 202. The IP addresses are exposed to the traditional stack through an intermediate driver 300 that exports upper layer virtual devices IPA 310, IPB 312 and IPC 314 on behalf of each of the active resources. An IP address is not currently assigned to, nor is there a virtual device exported for, RNIC4 466 in the embodiment as shown because it is employed as a standby for redundancy purposes and is not active except when one of the currently active resources fails. The protocols for the offloaded stack reside as virtual protocol offload components 420, 422, 424, 426 within each of the hybrid RNICs 460, 462, 464 and 466 respectively, as described in detail in the cross-referenced related applications.

In an embodiment, the teaming driver 300 teams the available resources to appear as one virtual resource for each of the exported virtual layer2 devices 310, 312 and 314. In an embodiment, an instance of teaming driver 300 is instantiated that teams the four RNICs together (including the standby) as a single virtual device. Thus, it looks like three different teams (one for each of the exposed IP addresses) sharing the same set of resources. The teaming driver 300 then serves to load-balance the data transmitted over conventional connections that have been established using each of the exposed IP addresses.

At the same time, offloaded connections can also be established through each of the active RNICs 460, 462, 464. The translation mechanism for establishing offloaded connections works similarly to that disclosed in the cross-referenced related applications, except that the initial query can specify any one of the exposed public IP addresses IPA, IPB or IPC. The translation mechanism (including DLL 318) translates the tuple specified in the query (i.e. one of the exposed IP addresses and a first port number associated with the server application 305 to which the connection is to be made), to one or more tuples that each can include a different one of the exposed IP addresses and a second port number translated from the first.

Figure 4A:
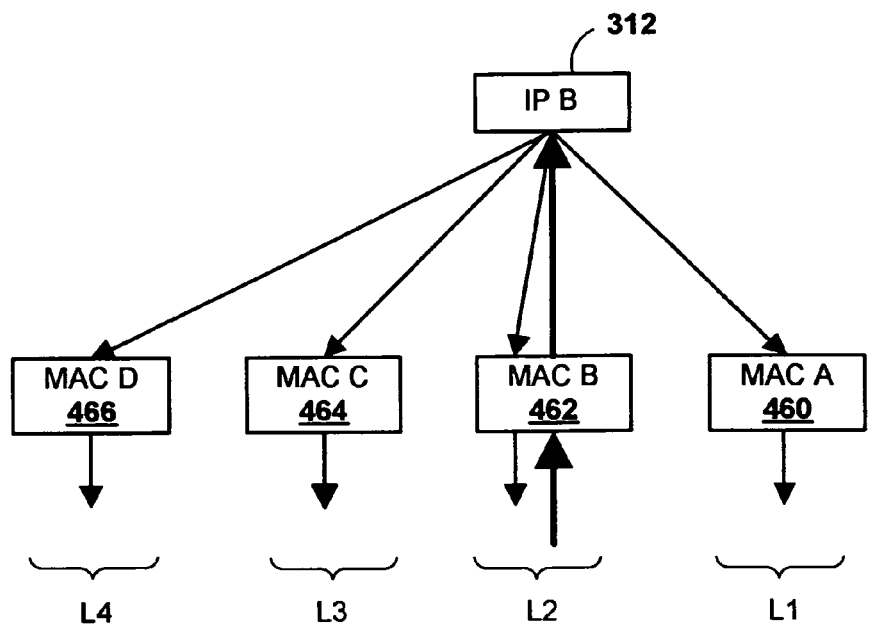
FIGS. 4A and 4B are conceptual representations of the computer system of FIGS. 1-3 illustrating the sharing of the same hybrid resources over a plurality of TLB teams in accordance with an embodiment of the invention.

FIG. 4A illustrates the TLB teaming of hybrid RNICs 460, 462, 464 and 466 for virtual layer2 device IPB 312. The data transmitted over conventional connections using IP address IPB as part of its local (i.e. destination) endpoint at the server is load-balanced over all four RNICs 460, 462, 464 and 466. This is true even though RNIC4 466 is otherwise acting as a standby in that no virtual device is exported to the traditional stack nor has any IP address been assigned to it for purposes of establishing offloaded connections. This is possible because the intermediate driver is attached to the layer 2 interface of all hybrid RNICs, including any acting as standbys. As with typical TLB teams, the data received by the team is still only through the single hybrid RNIC to which is assigned the team MAC address (i.e. the resource for which that virtual device was exported). In the embodiment, RNIC2 462 associated with the team MAC address=B is the one that receives data over conventional connections having IPB as part of its destination endpoint.

Figure 4B:
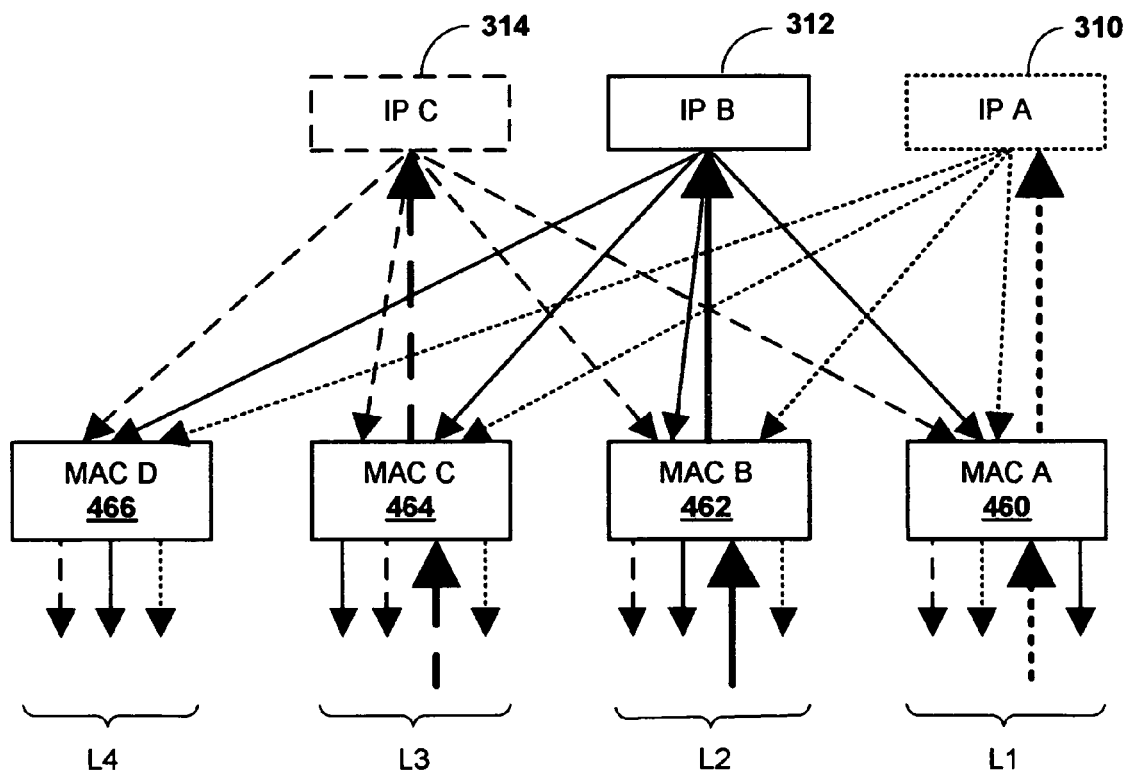

FIG. 4B illustrates the teaming of the hybrid RNICs 460, 462, 464 and 466 for each of the virtual devices IPA 310, IPB 312, and IPC 314 superimposed upon one another. Thus, data transmitted over conventional connections having any one of the public IP addresses as part of its destination endpoint is load-balanced over the team of RNICs as illustrated. Data received over those connections is through the RNIC to which the team's MAC address is assigned as illustrated. RNIC4 466 does not receive any data because in this example, no virtual layer 2 device has been exported to interface it to the TCP/IP 302 conventional stack and thus its MAC address is not assigned to a TLB team.

Data flowing through offloaded connections (not shown) flow through the one of the hybrid RNICs associated with the IP address comprising the translated tuple used as the local server endpoint for that offloaded connection. This will be the same hybrid RNIC that has as its MAC address the team MAC address for the conventional connections as well. The data transmitted over offloaded connections is not load-balanced in the manner described for conventional connections because data flowing through an offloaded connection must always flow in both directions through the same RNIC for the life of the connection; all of the connection state information resides within the RNIC through which the connection was originally established. Thus, aggregation for offloaded connections is one of connection capacity rather than data traffic generally. This is explained in more detail in the related applications cross-referenced above.

Hybrid RNIC4 466 is also a standby with respect to the offloaded connections. A failover operation can be executed when one of the other team members fails. If this happens, the IP address and the corresponding virtual device originally assigned to the failed RNIC is re-assigned to the stand-by RNIC. Transmission of data traffic over the offloaded connections established through the failed RNIC is suspended until the offloaded connections established over the failed RNIC (including their respective state information) are transferred to the standby RNIC. A more detailed discussion of this process is disclosed in the related applications cross-referenced above.

Connection balancing of the offloaded connections over the team of RNICs can be achieved either locally at the server or remotely at the client. For example, in response to a connection query, the server can supply a translated tuple back to the client that includes the IP address of the RNIC over which some locally executed load-balancing algorithm has chosen to establish the connection. Alternatively, the server can supply in a response to the client query a set of translated tuples for all available RNICs and a load-balancing algorithm executed at the client can choose between them. For more detail regarding the connection-balancing mechanisms of offloaded connections, please see the related applications cross-referenced above.

FIGS. 5-11 illustrate various scenarios by which the present invention can handle load-balancing and/or redundancy/failover functions for conventional connections established over a team of hybrid RNICs that are physically shared with an aggregated offloaded stack. Each of these scenarios will be discussed in detail below. These figures depict data flow for conventional connections only. Impact on the offloaded stack will be discussed where appropriate.

Figure 5A:
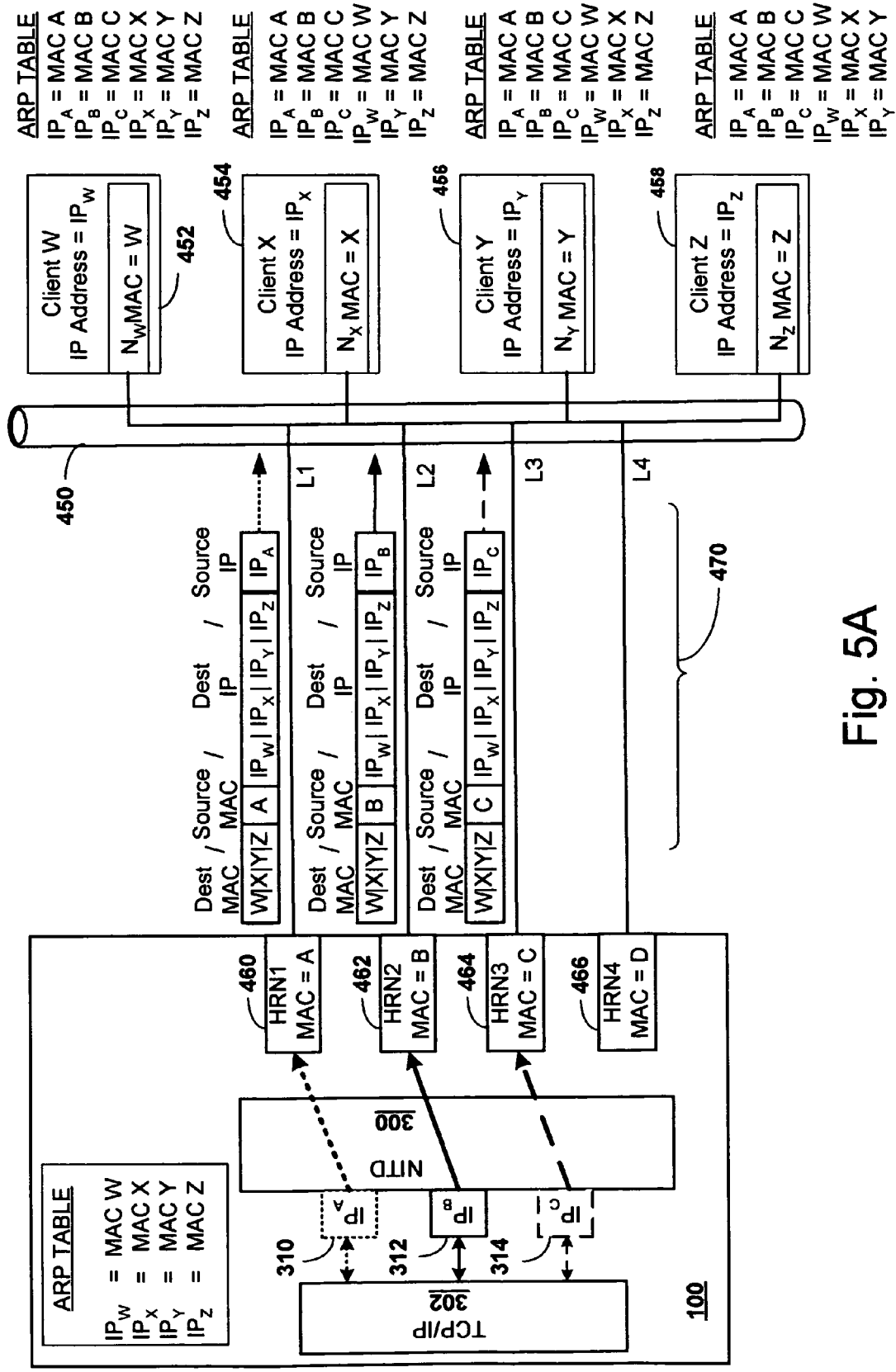
FIGS. 5A and 5B are block diagrams illustrating the transmit and receive traffic respectively for conventional connections established between a configuration of the computer system of FIGS. 1-3 in communication with clients over a network in accordance with embodiments of the invention.

FIG. 5A illustrates an embodiment of system 100 in communication with multiple clients W 452, X 454, Y 456 and Z 458 over network 450. System 100 is configured with hybrid RNICs HRN1 460, HRN2 462, HRN3 464 and HRN4 466 having MAC addresses A, B, C and D and respectively. IP addresses IPA, IPB and IPC are assigned to HRN1 460, HRN2 462 and HRN3 464 respectively. These three IP addresses are exposed to the traditional protocol stack including TCP/IP layers 302 through virtual layer2 devices IPA 310, IPB 312 and IPC 314 respectively, which are exported by intermediate teaming driver NITD 300. In this case, HRN4 466 is employed as a standby resource for redundancy purposes. Intermediate driver 300 has attached itself to the layer2 interfaces of all four HRNICs.

Figure 5B:
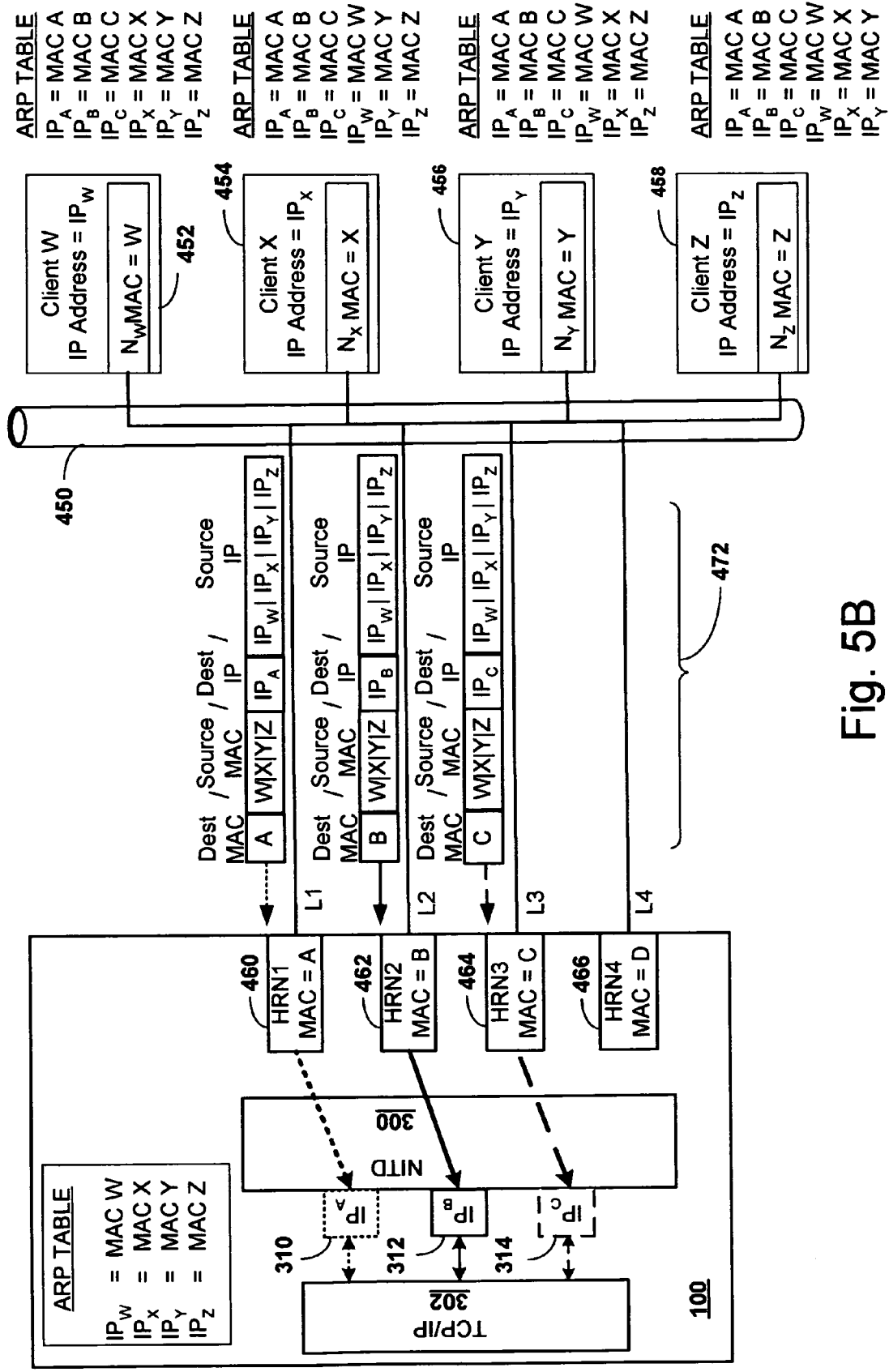

Conventional connections are established over each active HRN (460, 462, 464) based upon which of the three IP addresses is specified in a client's request to establish a conventional connection over the traditional stack. Likewise, offloaded connections are established over the active hybrid RNICs in accordance with which of the assigned IP addresses comprises the translated tuple chosen to establish the server endpoint of each offloaded connection. As previously mentioned, this translation process is described in detail in the related applications cross-referenced above. In the embodiment of FIGS. 5A and 5B, three teams of one active hybrid RNIC each are created for each virtual device through teaming driver 300, with each team's MAC address being the MAC address for the HRNIC that forms the team and for which the virtual device was created.

In FIG. 5A, the frames of transmit traffic 470 transmitted over links L1, L2 and L3 are illustrated. Each active HRNIC can transmit frames for conventional connections with each of the clients W 452, X 454, Y 456 and Z 458. This is indicated by the generalized frame for each resource, where the destination IP addresses can be IPW, IPX, IPY and IPZ, and the destination MAC addresses can be W, X Y and Z respectively. The IP/MAC address pairing for each of the clients is reflected in the ARP table of system 100. In FIG. 5B, the generalized frames of receive traffic 472 received by the HRNICs of system 100 over links L1, L2 and L3 are illustrated. Once again, the MAC address for each single member team is of that HRNIC that makes up the team. The frames of receive traffic 472 can have any one of the three IP addresses as a destination IP address corresponding to the virtual layer2 devices exported by the teaming driver 300. Likewise, those frames will also have either A, B or C respectively as its destination MAC address.

Figure 6A:
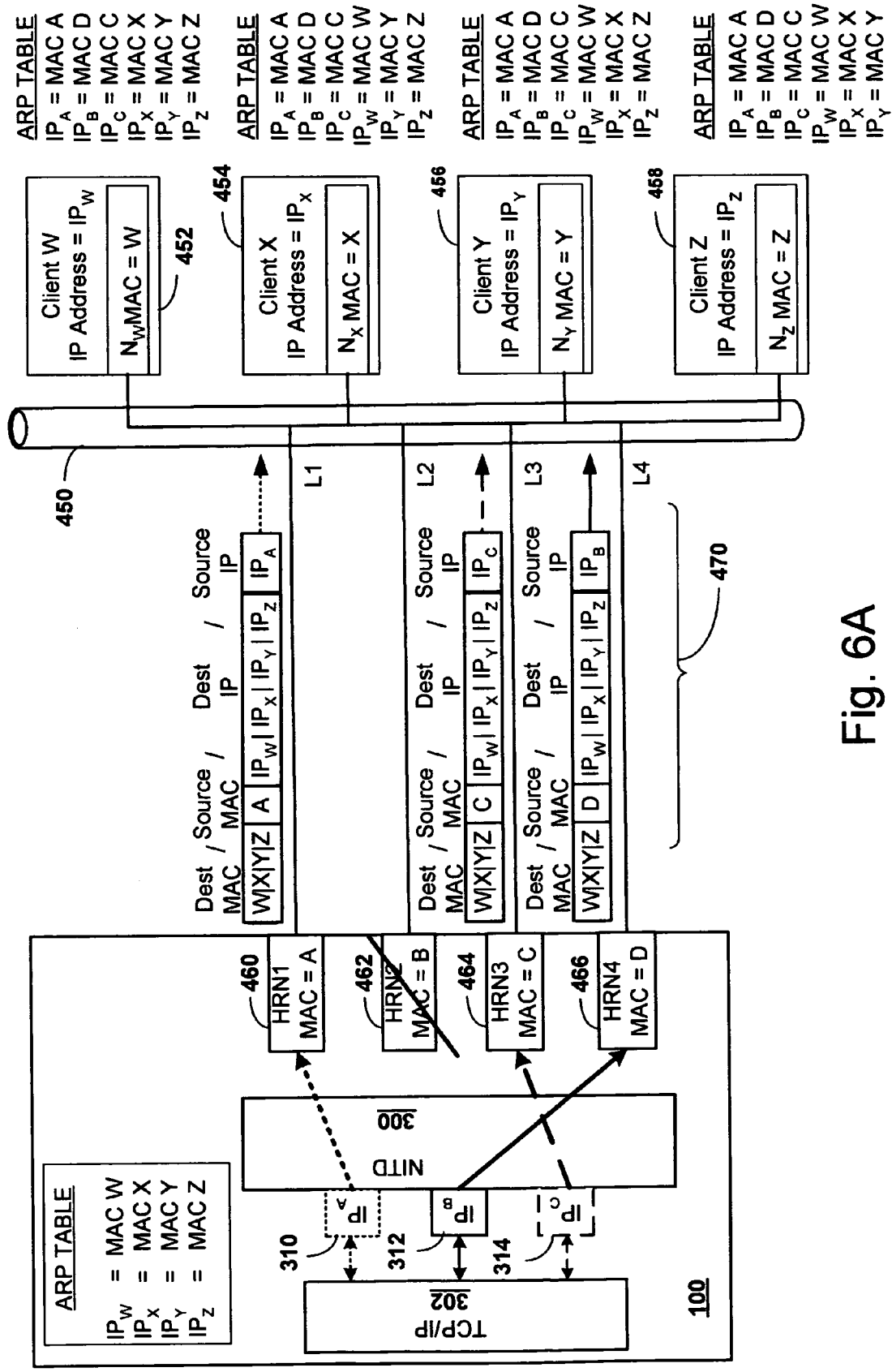
FIGS. 6A and 6B are block diagrams illustrating the transmit and receive traffic respectively for conventional connections established between a configuration of the computer system of FIGS. 1-3 in communication with clients over a network for which a failover has occurred to a standby device in accordance with embodiments of the invention.

FIG. 6A illustrates what can happen to the configuration of the HRNIC resources as well as transmit frames 470 in the event one of the active HRNICs fails (e.g. HRN2 462) and a failover to the standby HRN4 466 is initiated. Typically, teaming driver 300 can recognize that RNIC2 462 has failed and that a failover should be initiated. In this case, the teaming driver 300, aware of the availability of standby HRN4 466, now associates the virtual layer2 device IPB 312 with the newly active HRN4 466. As a result, data frames 470 transmitted over the conventional connections associated with IPB are now transmitted through HRN4 466 and over its link L4. The clients W 452, X 454, Y 456 and Z 458 are notified through known techniques that their respective ARP tables should be updated to reflect that the IP address IPB is now associated with MAC address D. All frames for connections having the source IP address of IPB are now transmitted through virtual interface 312 and HRN4 466 to any of the clients on the network.

Figure 6B:
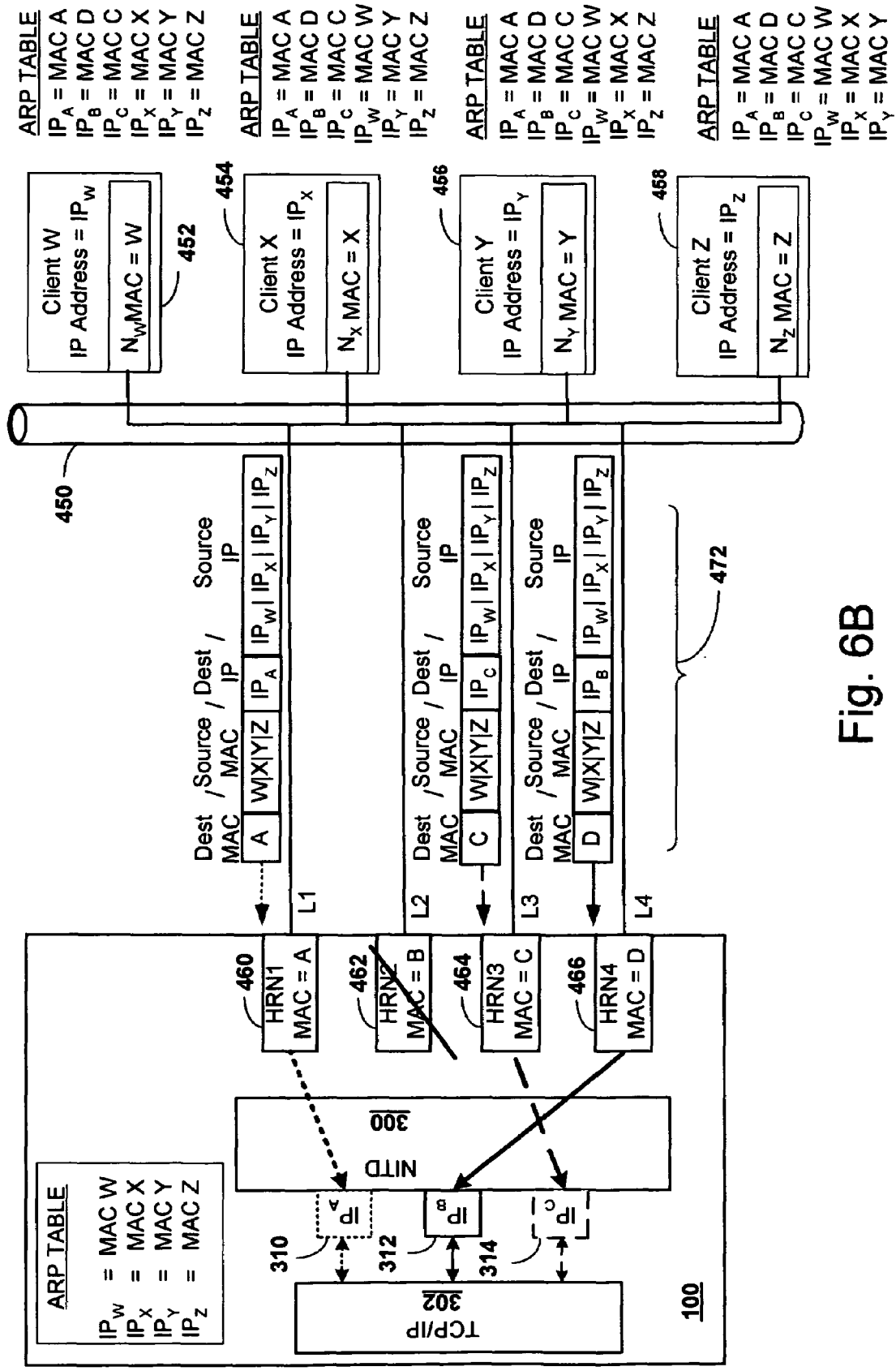

With regard to received frames 472 as illustrated in FIG. 6B, frames for conventional connections having IPB as a destination IP address are now directed through HRN4 466 by way of destination MAC address D. The packets contained in the frames are passed up to the traditional protocol stack including TCP/IP 302 through the IPB virtual device 312 as shown. The ARP tables of the clients W 452, X 454, Y 456 and Z 458 have been updated to reflect the association of MAC address=D with IP address IPB. As previously mentioned, all offloaded connections previously established over HRN2 462 can be transferred, along with their respective connection state information, to the standby HRN4 466 as is described in the cross-referenced related applications to complete the failover process for both stacks.

Figure 7A:
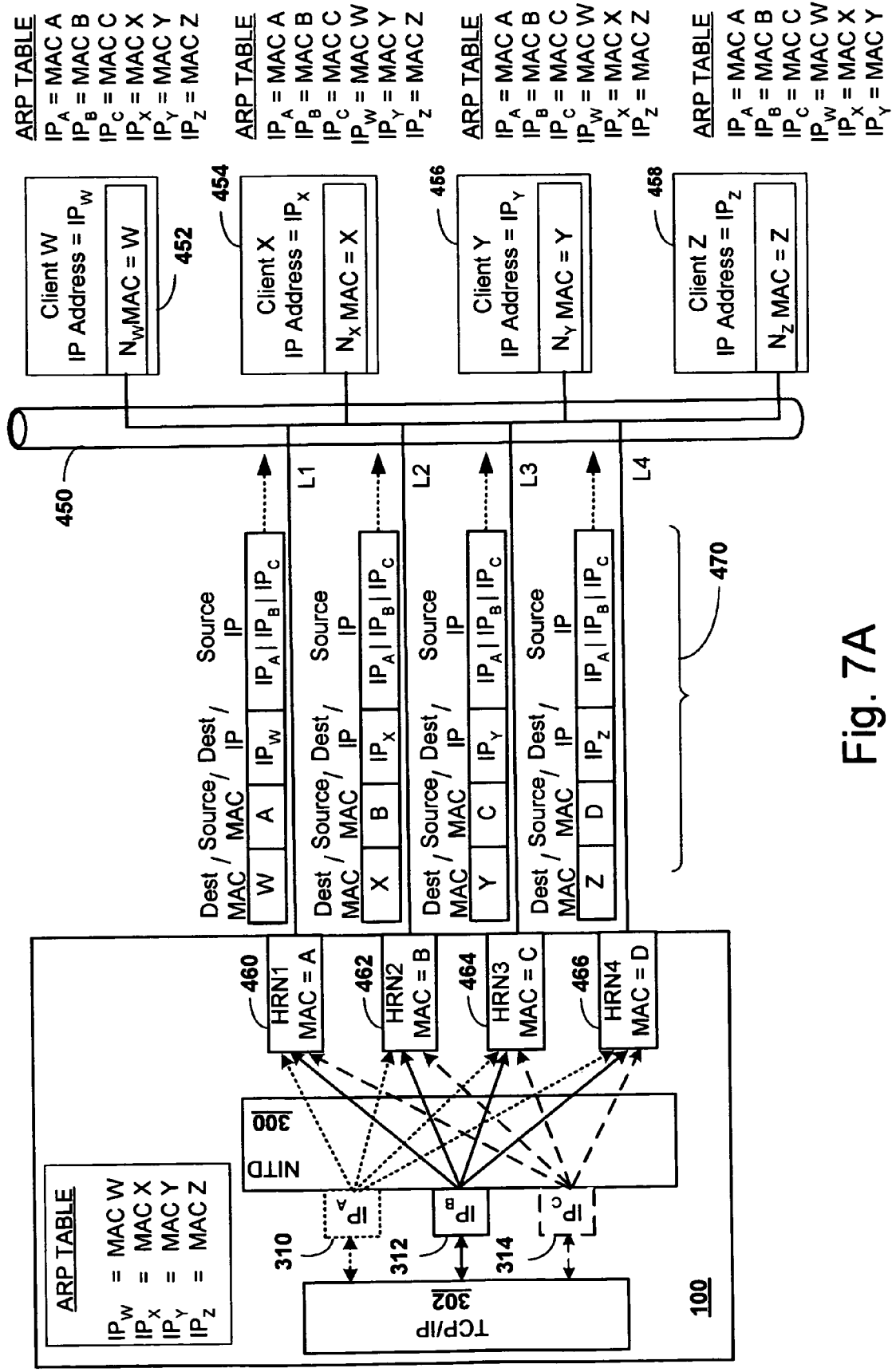
FIGS. 7A and 7B are block diagrams illustrating the transmit and receive traffic respectively for conventional connections established between a configuration of the computer system of FIGS. 1-3 in communication with clients over a network having TLB teams for each exported virtual device in accordance with embodiments of the invention.

FIG. 7A illustrates the transmit load-balancing (TLB) of packets transmitted for the connections established over each of the virtual device IPA 310, IPB 312 and IPC 314 over all available HRNIC resources, including standby HRN4 466. In this case, a TLB team is established through an instance of teaming driver 300 for each of the virtual interfaces, each having the same resources. In an embodiment, teaming driver 300 includes a TLB algorithm the execution of which results in the transmit load-balancing of the packets having the source IP address associated with each team over the four HRNICs. This is the same as the three superimposed teams sharing the same four resources as illustrated in FIG. 4B. Those of skill in the art will recognize that the number of teams (and therefore virtual devices exported) are not limited to three, nor are the number of resources included in each team limited to the four HRNICs of the embodiment. Moreover, if separate instances of the teaming driver 300 are employed for each virtual device, the number of the available resources included with each team can differ if desired. Put another way, each team can constitute different subsets of the available resources.

For the embodiment illustrated in FIG. 7A, the teaming driver 300 executes a load-balancing algorithm that distributes each particular client destination IP or MAC address to one of the team members to balance the conversations over the team on a client-by-client basis. Thus, all frames for conversations with a particular client are handled by one of the one of the four team members. Thus, all frames for conversations with client W 452 are transmitted over HRN1 460, all frames for conversations with client X 454 are transmitted over HRN2 462, all frames for conversations with client Y 456 are transmitted over HRN3 464 and all frames for conversations with client Z 458 are transmitted over HRN4 466. In an embodiment, additional clients could be assigned in a round-robin fashion starting again with HRN1 460. Those of skill in the art will recognize that numerous load-balancing algorithms can be implemented without exceeding the intended scope of the present invention and this is but one example.

Figure 7B:
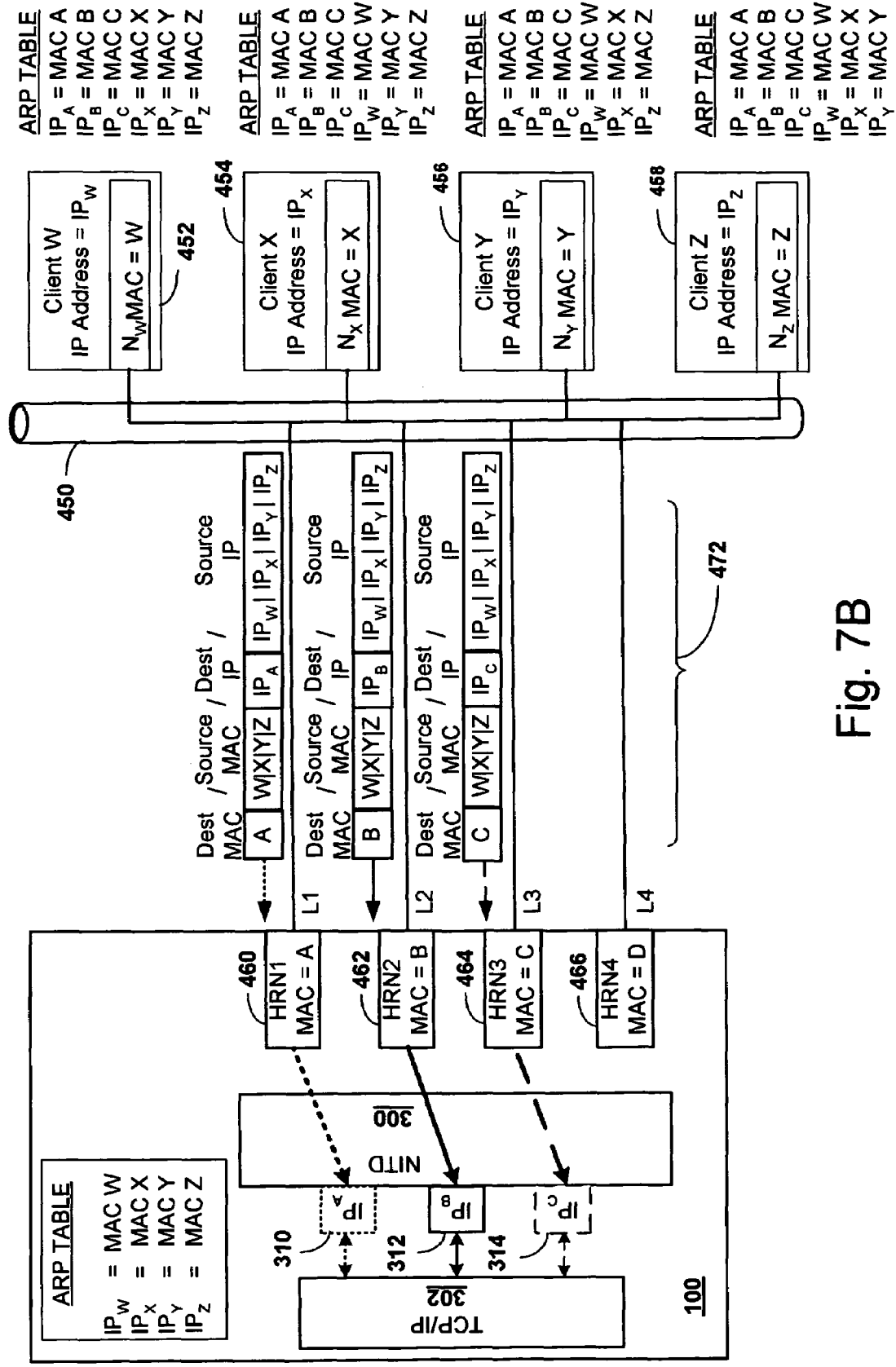

Thus, the generalized transmit frames 470 reflect the fact that the frames transmitted from each HRNIC can have any one of the IP addresses as its source IP address, but will have only those destination IP addresses (and corresponding MAC addresses) corresponding to those conversations to which it is assigned by the load-balancing algorithm. With regard to received frames 472 as illustrated in FIG. 7B, frames for conventional connections are directed to a primary HRNIC for the team; the team member having a MAC address that is designated as the team MAC address as in typical TLB teams. In the embodiment, the primary HRNIC for each team is simply the one for which the particular virtual device was originally exported. Thus, the primary for the IPA 310 TLB team is HRN1 460, for the IPB 312 TLB team is HRN2 462, and for the IPC 314 team is HRN3 464. Because standby HRN4 466 is not associated with a virtual device, it is not a primary for any team and thus receives no conversational frames from the network as illustrated. Frames for all offloaded connections (not shown) are directed over the HRNIC chosen for a particular connection through the endpoint tuple translation process described in detail in the aforementioned related applications.

Figure 8A:
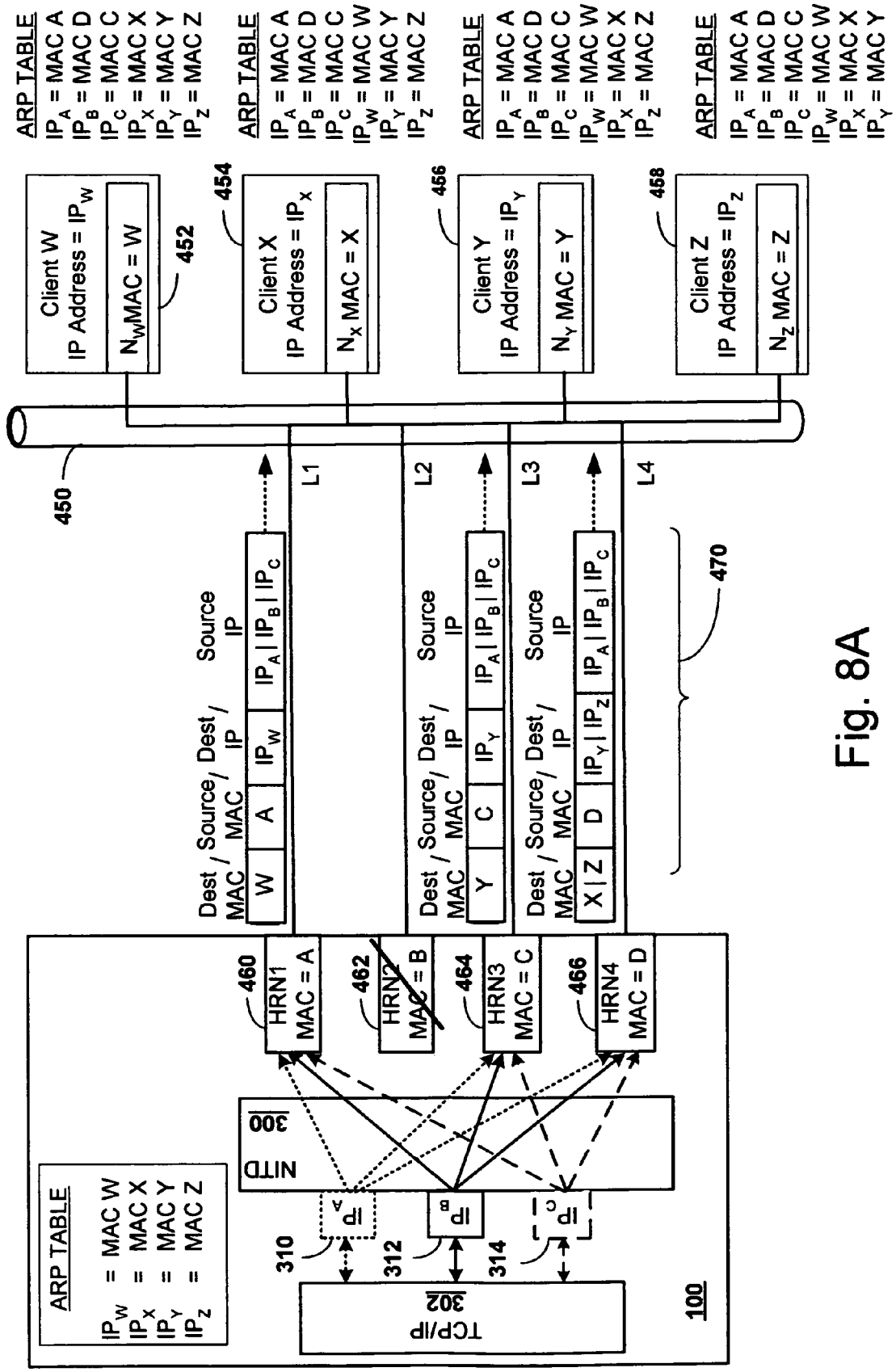
FIGS. 8A and 8B are block diagrams illustrating the transmit and receive traffic respectively for conventional connections established between a configuration of the computer system of FIGS. 7A and 7B for which a failover has occurred in accordance with embodiments of the invention.

FIG. 8A illustrates a scenario where the embodiment of FIGS. 7A/7B experiences a failure of one of the primary HRNICs such as HRN2 462. Teaming driver 300 senses the loss of this primary HRNIC for the team associated with the IPB virtual interface 312. A failover is initiated wherein the standby HRN4 466 is substituted as the primary HRNIC for that TLB team. The TLB team's MAC address becomes MAC=D, and thus all clients must update their ARP tables to reflect the fact that the MAC address associated with the IP address IPB is now MAC=D.

Figure 8B:
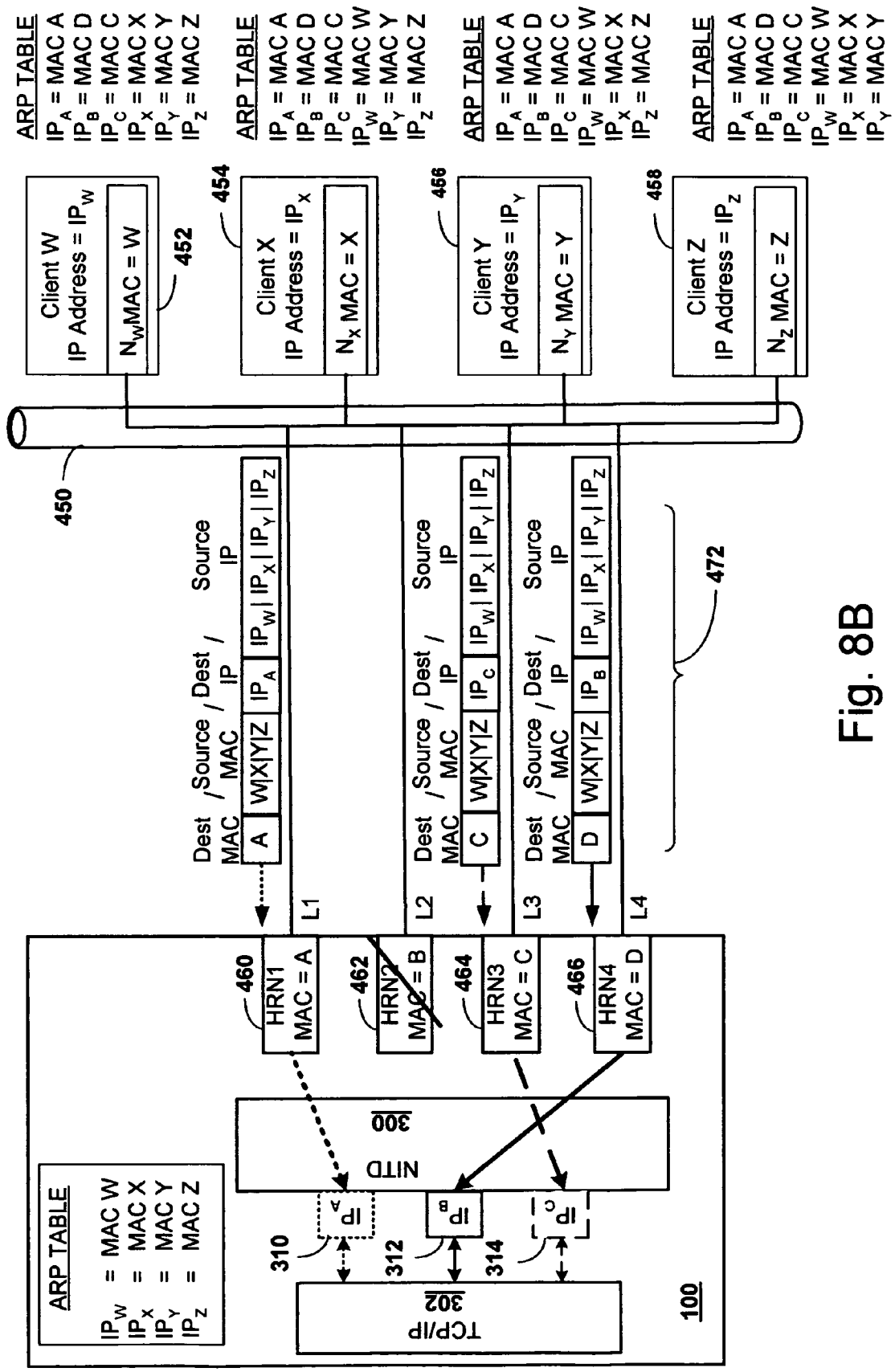

As a result of the failure, the other teams also lose the use of HRN2 462 for TLB purposes and no longer load-balance their data using the failed HRN2 462. The TLB teams now load-balance over the three remaining HRNICs. The load-balancing algorithm for each team adjusts for the loss of one of the available members of the TLB team by re-distributing the conversations previously assigned to HRN2 462 to the three remaining HRNICs of the team. In the example of FIG. 8A, the frames transmitted for conversations with client X 454 are re-assigned to HRN4 466. Thus, frames transmitted over HRN4 464 can now have either IPX or IPZ as their destination IP addresses as indicated by the generalized frames 470. The generalized received frames 472 illustrated in FIG. 8B illustrate the fact that the primary HRNIC for the IPB TLB team is now HRN4 466. For offloaded connections established over the failed HRN2 462, they can be migrated to the standby HRN4 464 as previously discussed. All clients can be made aware of the fact that the MAC address associated with IPB is now MAC=D using known techniques.

Figure 9A:
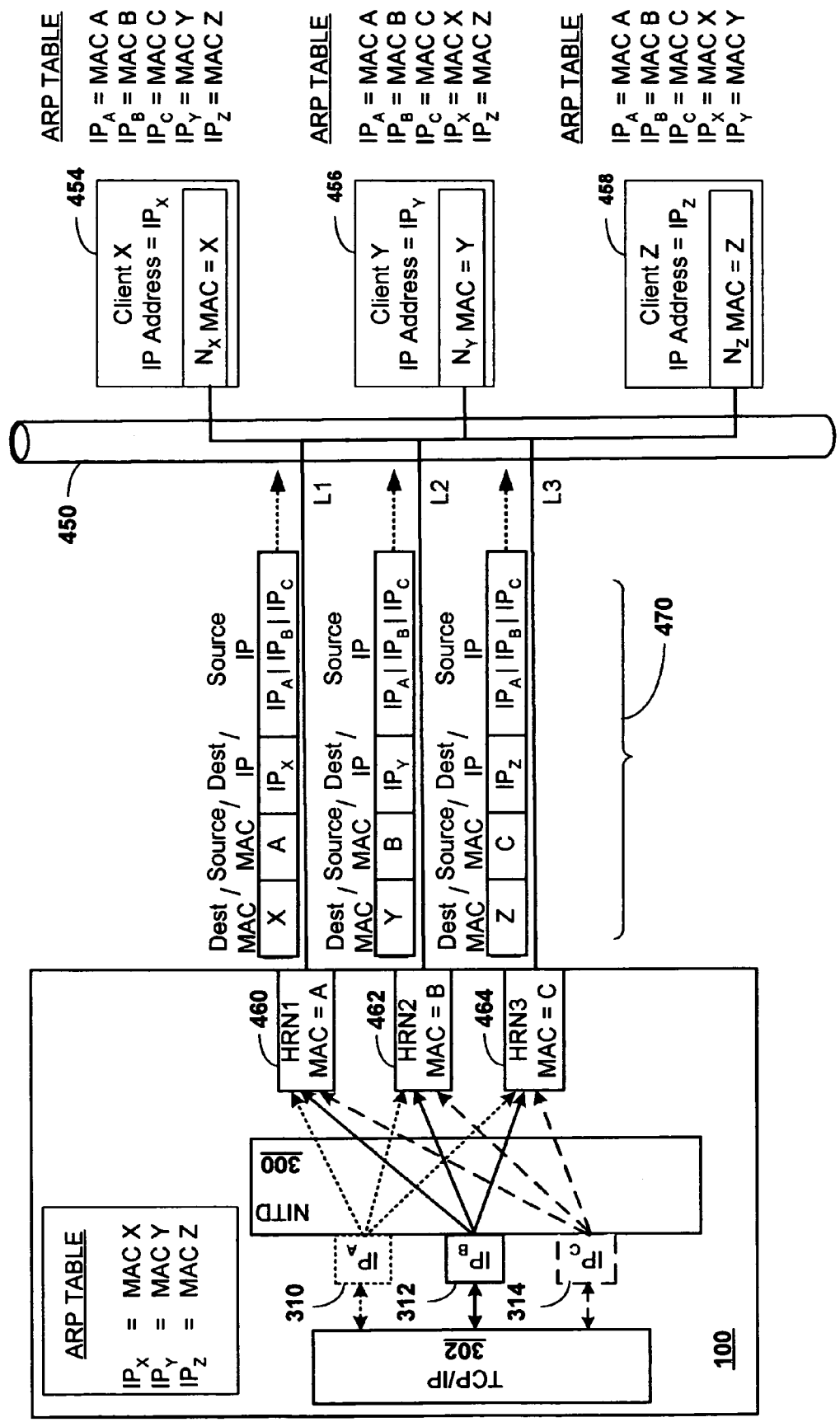
FIGS. 9A and 9B are block diagrams illustrating the transmit and receive traffic respectively for conventional connections established between a configuration of the computer system similar to that illustrated in FIGS. 7A and 7B except that there is no standby resource.
Figure 9B:
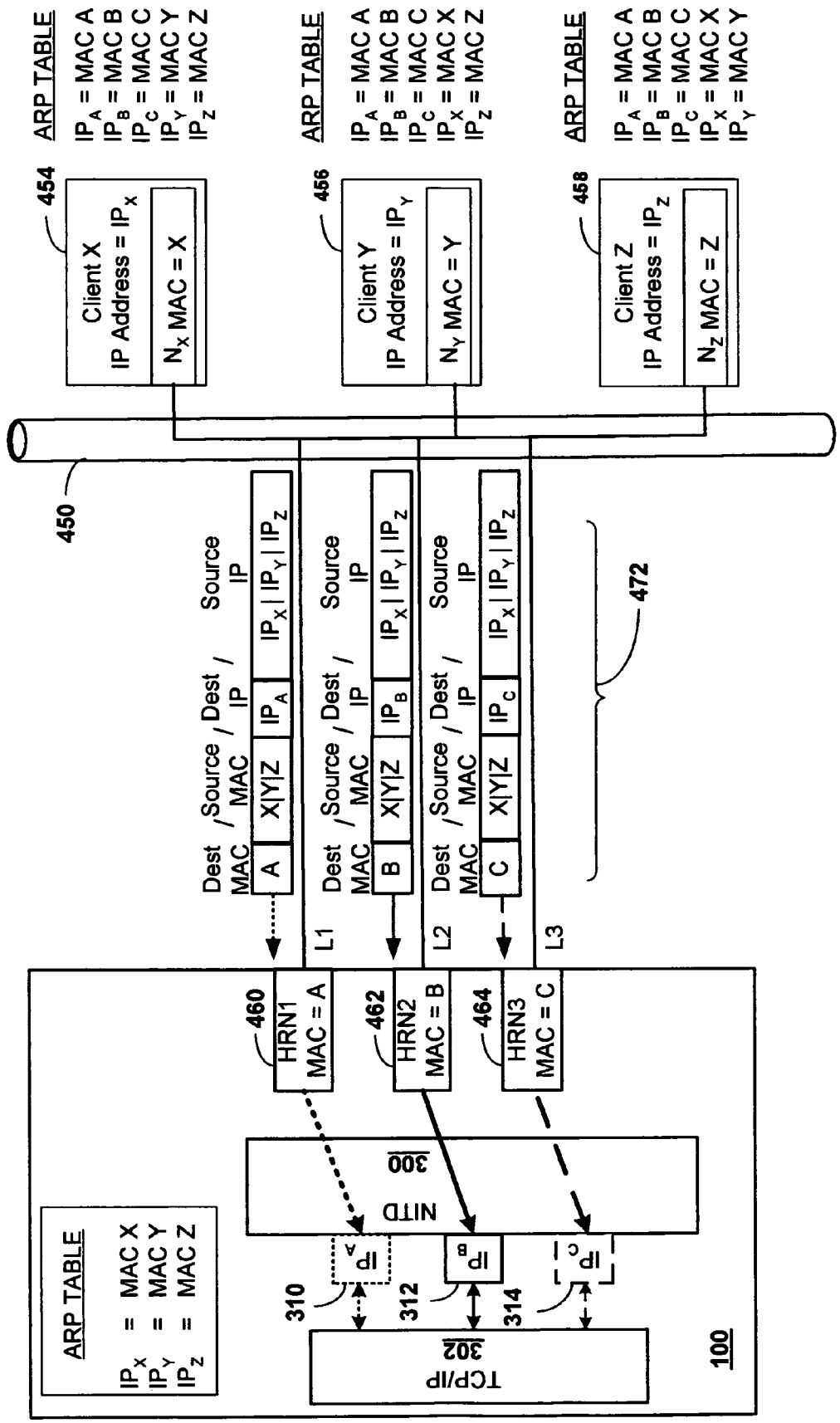

The embodiment of FIGS. 9A/9B illustrates a scenario similar to that of FIGS. 7A/7B but with only three HRNICs and thus no standby device. The embodiment of FIGS. 10A/10B illustrates a scenario where a failure occurs for one of the HRNICs of the team illustrated in FIGS. 9A/9B that also results in a loss of the virtual device for that HRNIC. In this case where HRN2 462 fails along with its exported virtual device IPB 312, the connections established with clients X 454, Y 456 and Z 458 using IPB as one of the server endpoint IP addresses are lost. They can be reestablished over one of the remaining operative HRNICs. The other two teams also lose HRN2 462 as a resource over which to load-balance their transmitted data, and their transmit data is now balanced over the two remaining active HRNICs. As a result, those client conversations originally assigned to HRN2 462 (in this case those conversations with client Y 456) must now be redistributed to the remaining active resources as illustrated. The received frames 472 of FIG. 10B demonstrate the loss of connections for which IPB is a destination IP address. Offloaded connections established over the failed RNIC are either terminated (and which can be reestablished over the remaining two resources), or they can be redistributed (along with their connection state information) to the other two HRNICs if they have the requisite connection capacity available to accommodate the re-assigned connections.

Figure 10A:
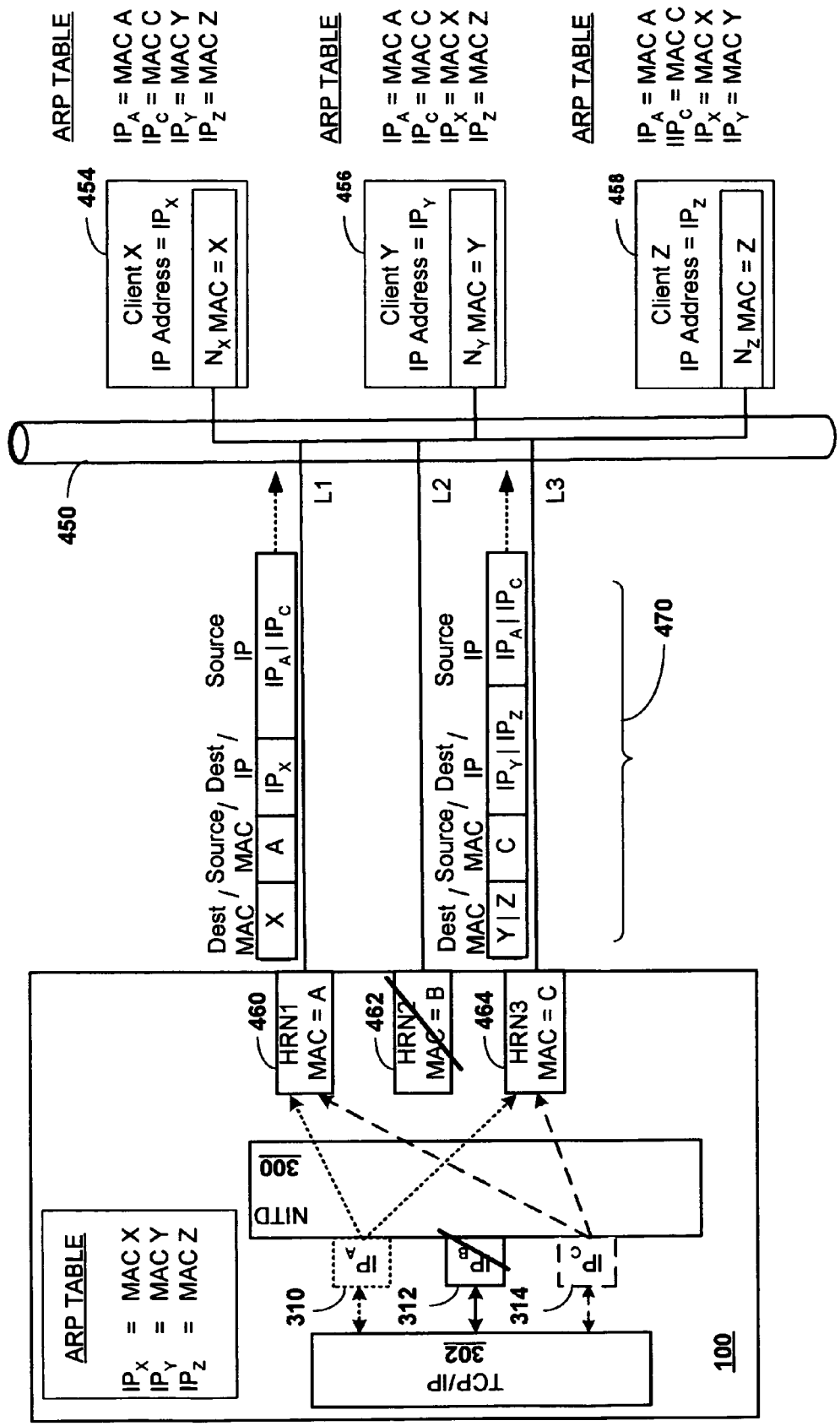
FIGS. 10A and 10B are block diagrams illustrating the transmit and receive traffic respectively for conventional connections established between a configuration of the computer system of FIGS. 9A and 9B for which a failover has occurred where both an active resource and its exported virtual device have failed.
Figure 10B:
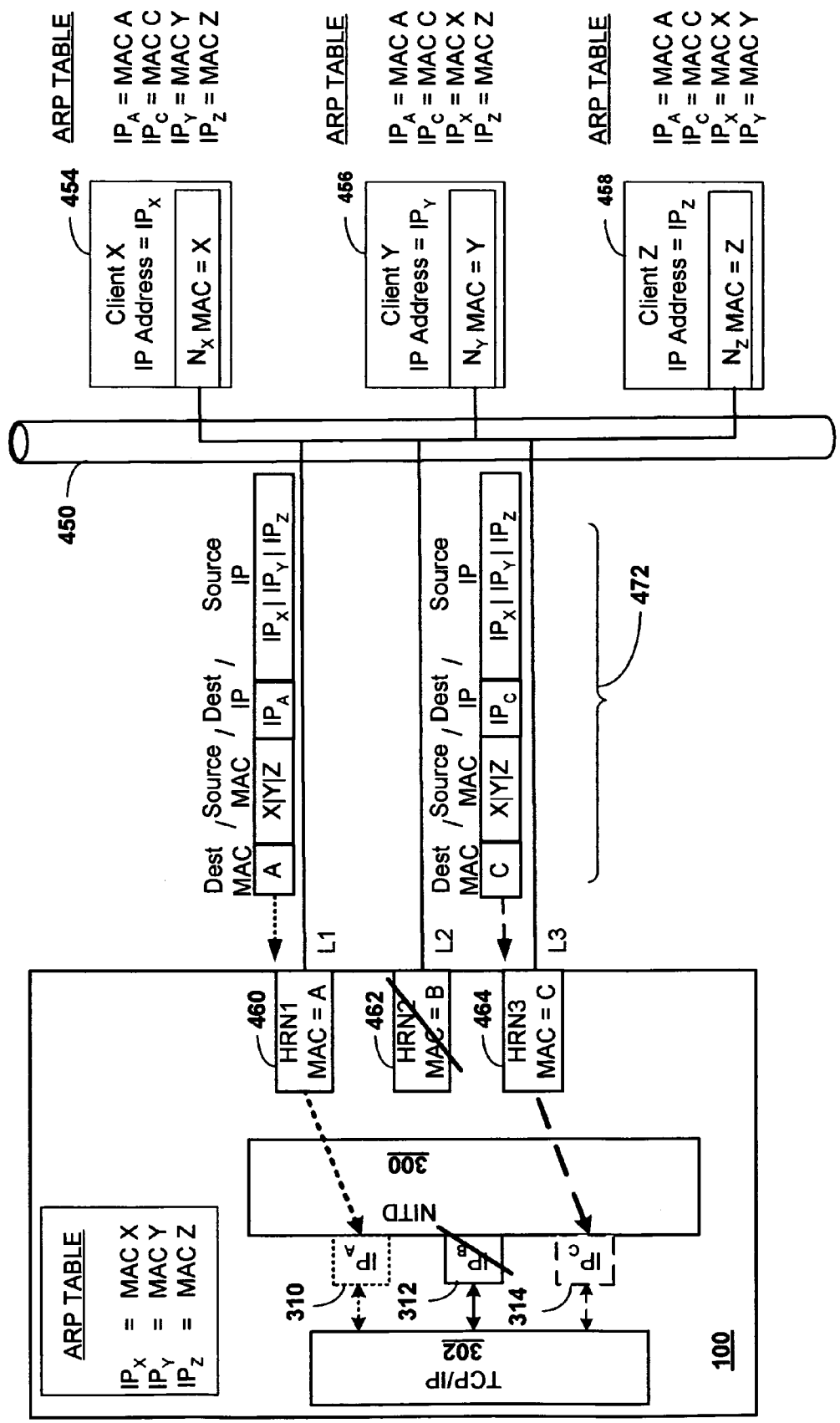
Figure 11A:
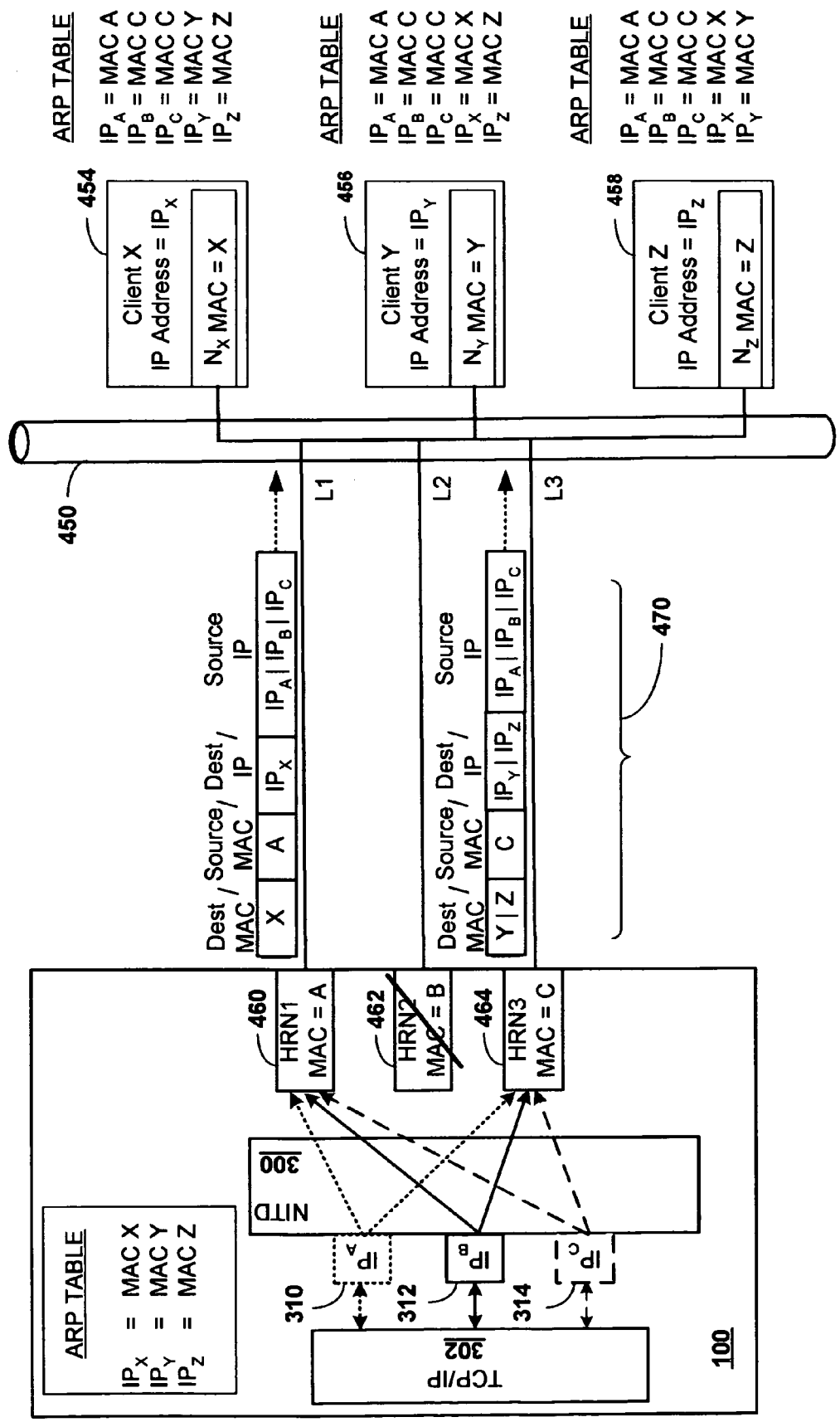
FIGS. 11A and 11B are block diagrams illustrating the transmit and receive traffic respectively for conventional connections established between a configuration of the computer system of FIGS. 10A and 10B for which a failover has occurred where an active resource has failed but its exported virtual device has not.
Figure 11B:
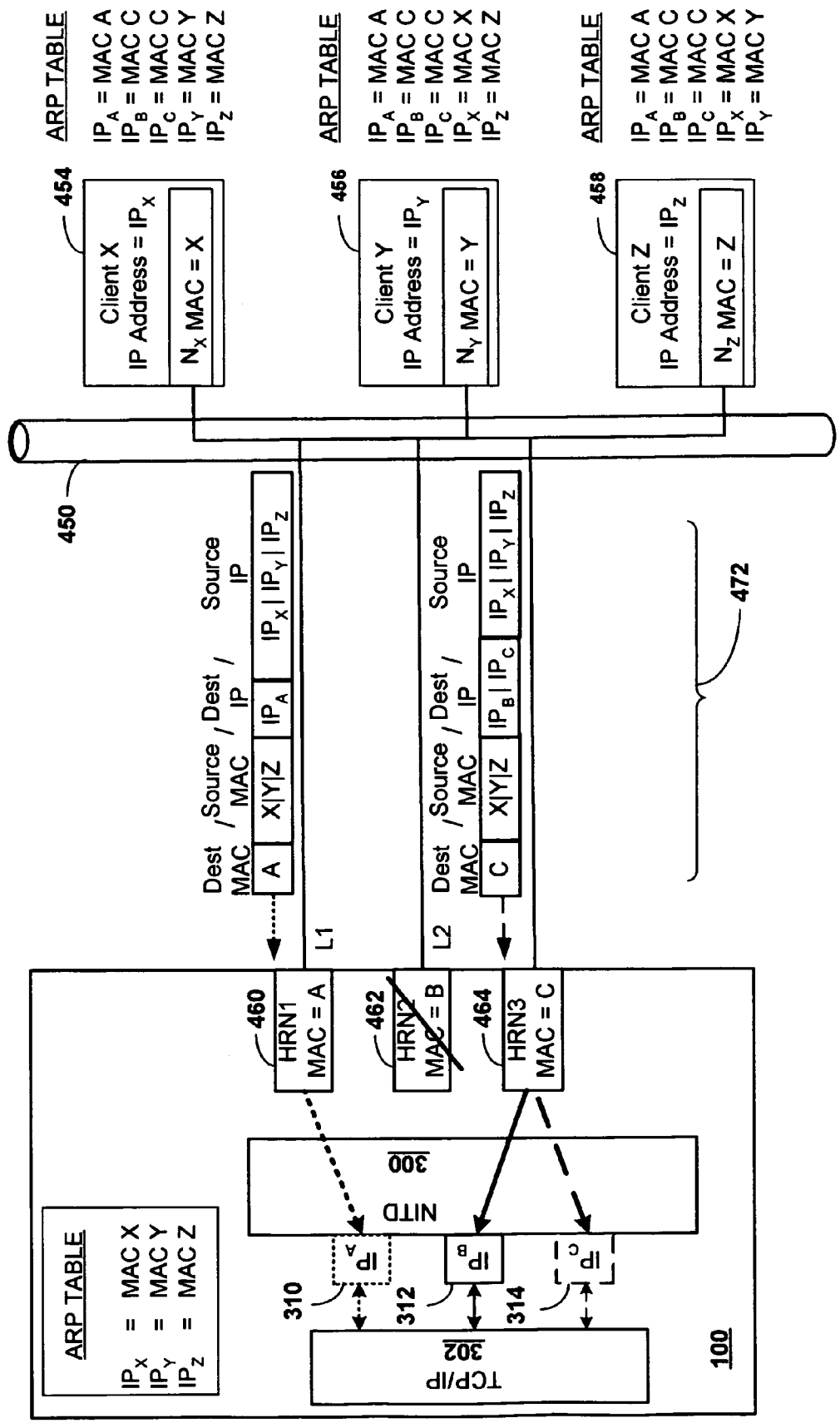

The embodiment of FIGS. 11A/11B illustrates the scenario of FIGS. 10A/10B where failure of the HRN2 462 does not result in the failure of its exported virtual device IPB 312. In this case, one of the remaining resources (e.g. HRN3 464) can be associated with the virtual device IPB 312 as well as the virtual device IPB 314. Connections established prior to the failure using IPB are not lost as a result and are instead carried by HRN3 464. Moreover, all three TLB teams remain active except that the transmit data for each virtual device is now distributed over one less HRNIC. Conversations for client Y 456 previously assigned to HRN2 462 can be assigned to a different member of the team (e.g. HRN3 464). The receive frames 472 illustrated in FIG. 11B show that all previously established connections are still active, and those destined for IPB are now received through HRN3 464 by way of MAC address=C. Thus, the ARP tables of the clients are updated to reflect that packets carried over connections directed to destination address IPB are now sent to MAC address=C instead of B. The offloaded connections in this case can be transferred to HRN3 464 as well.

The foregoing embodiments implement the teaming of hybrid resources shared between a traditional and an offloaded protocol stack, to provide redundancy and load-balancing of data for conventional connections established through the traditional stack, as well as the aggregation of connection capacity and redundancy for offloaded connections established over the offloaded protocol stack. Those of skill in the art will recognize that the embodiments disclosed herein are not intended to limit the number of HRNICs that may be teamed together as described.

What is claimed is:

1. A method of aggregating a plurality of hybrid network resources of a computer system, the hybrid resources for supporting offloaded connections with a first set of clients and for supporting conventional connections with a second set of clients, the conventional and offloaded connections established through a common physical connection of each of the resources to a network, said method comprising:
    assigning a unique protocol address to each of two or more active ones of the hybrid network resources;
    exporting a virtual layer2 device for each of the two or more active resources;
    exposing the assigned protocol addresses to a protocol stack residing in the operating system of the computer system, each of the assigned protocol addresses being exposed through and associated with the virtual device exported for the one of the active resources to which the protocol address is assigned; and
    establishing one or more of the conventional connections with the second set of clients through the active resources and their respective virtual devices.

2. The method of claim 1 wherein each of the established conventional connections has a local endpoint comprising the one of the exposed protocol addresses corresponding to the virtual device through which the connection is established.

3. A method of aggregating a plurality of hybrid network resources of a computer system, the resources for supporting offloaded connections with a first set of clients and for supporting conventional connections with a second set of clients, the conventional and offloaded connections established through a common physical connection of each of the resources to a network, said method comprising:
    assigning a unique protocol address to each of two or more active ones of the resources;
    exporting a virtual layer2 device for each of the two or more active resources;
    exposing the assigned protocol addresses to a protocol stack residing in the operating system of the computer system, each of the assigned protocol addresses being exposed through and associated with the virtual device exported for the one of the active resources to which the protocol address is assigned;
    establishing one or more of the conventional connections with the second set of clients through the active resources and their respective virtual devices; and
    establishing offloaded connections through protocol offload devices of the active resources.

4. The method of claim 3 wherein:
    each of the established conventional connections has a local endpoint comprising the one of the exposed protocol addresses corresponding to the virtual device through which the connection is established; and
    each of the established offloaded connections has a local endpoint comprising the protocol address assigned to the one of the active resources over which the connection is established.

5. The method of claim 3 wherein at least one of the plurality of resources is operable as a standby resource, said method further comprising:
   failing over to the at least one standby resource in response to the failure of one of the active resources, said failing over further comprising:
   coupling the at least one standby resource with the virtual device exported for the failed active resource; and
   notifying the second set of clients that the assigned protocol address and the corresponding virtual device exported for the failed active resource is now associated with the at least one standby resource.

6. The method of claim 5 wherein said failing over further comprises:
   suspending data transfer over all offloaded connections having an endpoint comprising the protocol address assigned to the failed active resource;
   transferring the suspended connections and their respective connection states to the at least one standby resource; and
   notifying the first set of clients that the assigned protocol address previously assigned to the failed active resource is now associated with the at least one standby resource.

7. The method of claim 3 further comprising:
   for each of the exported virtual devices:
   load-balancing over the plurality of resources data transmitted to the second set of clients over conventional connections established through that exported virtual device, said load-balancing further comprising:
   establishing a transmit load-balance (TLB) team for each of the virtual devices exported for the plurality of resources; and
   distributing the transmitted data among the plurality of resources on a conversation-by-conversation basis.

8. The method of claim 7 wherein at least one of the plurality of resources is operable as a standby, said load-balancing further comprising:
   associating the virtual device exported for a failed active resource with a different one of the active resources;
   notifying the second set of clients that the protocol address of the virtual device associated with the different active resource is associated with the different active resource's MAC address; and
   redistributing the conversations previously assigned to the failed active resource to the remaining active resources including the at least one standby resource.

9. A computer system having an aggregated plurality of hybrid network resources, the resources for supporting offloaded connections with a first set of clients and for supporting conventional connections with a second set of clients, the conventional and offloaded connections established through a common physical connection of each of the resources to a network, said system comprising:
   means for assigning a unique protocol address to two or more active ones of the hybrid network resources;
   means for exporting a virtual layer2 device for each of the two or more active resources;
   means for exposing the assigned protocol addresses to a protocol stack residing in the operating system of the computer system, each of the assigned protocol addresses being exposed through and associated with the virtual device exported for the one of the active resources to which the protocol address is assigned; and
   means for establishing one or more of the conventional connections with the second set of clients through the active resources and their respective virtual devices.

10. The computer system of claim 9 wherein each of the plurality of resources comprises a protocol offload device, said computer system further comprising means for establishing offloaded connections through the protocol offload devices of the active resources.

11. The computer system of claim 10 wherein at least one of the plurality of resources is operable as a standby and for which a virtual device has not been exported.

12. The computer system of claim 11 further comprising means for failing over to the at least one standby resource in response to the failure of one of the active resources, said means for failing over further comprising:
   means for coupling the at least one standby resource with the virtual device exported for the failed active resource; and
   means for notifying the second set of clients that the assigned protocol address and the corresponding virtual device exported for the failed active resource is now associated with the at least one standby resource.

13. The computer system of claim 12 wherein said means for failing over further comprising:
   means for suspending data transfer over all offloaded connections having an endpoint comprising the protocol address assigned to the failed active resource;
   means for transferring the suspended connections and their respective connection states to the at least one standby resource; and
   means for notifying the first set of clients that the assigned protocol address previously assigned to the failed active resource is now associated with the at least one standby resource.

14. The computer system of claim 9 further comprising:
   for each of the exported virtual devices, means for load-balancing over the plurality of resources data transmitted to the second set of clients over conventional connections established through that exported virtual device.

15. The computer system of claim 14 wherein:
   said means for load-balancing further comprises means for establishing a transmit load-balance (TLB) team for each of the exported virtual devices; and
   means for distributing the transmitted data among the plurality of resources on a conversation-by-conversation basis.

16. The computer system of claim 15 further comprising:
   means for associating the virtual device exported for a failed active resource with a different one of the active resources;
   means for notifying the second set of clients that the protocol address of the virtual device associated with the different active resource is associated with the different active resource's MAC address; and
   means for redistributing the conversations previously assigned to the failed active resource to the remaining active resources.

17. The computer system of claim 15 further comprising means for redistributing the conversations previously assigned to the failed active resource to the remaining active resources of the TLB teams in response to failure of one of the active resources and its exported virtual device.

18. The computer system of claim 15 wherein at least one of the plurality of resources is operable to be a standby, said computer system further comprising:
   means for associating the virtual device exported for a failed active resource with the at least one standby resource;

means for notifying the second set of clients that the protocol address of the virtual device associated with the at least one standby resource is associated with the at least one standby resource's MAC address; and means for redistributing the conversations previously assigned to the failed active resource to the at least one standby resource.

19. A method of aggregating a plurality of hybrid network resources of a computer system, the hybrid resources for supporting offloaded connections with a first set of clients and for supporting conventional connections with a second set of clients, the hybrid resources each containing a protocol offload device, the conventional and offloaded connections established through a common physical connection of each of the resources to a network, said method comprising:

assigning a unique protocol address to each of two or more active ones of the hybrid network resources;

exporting a virtual layer2 device for each of the two or more active resources;

exposing the assigned protocol addresses to a protocol stack residing in the operating system of the computer system, each of the assigned protocol addresses being exposed through and associated with the virtual device exported for the one of the active resources to which the protocol address is assigned;

establishing one or more of the conventional connections with the second set of clients through the active resources and their respective virtual devices; and establishing offloaded connections through the protocol offload devices of the active resources, each of the established offloaded connections having a local endpoint comprising the protocol address assigned to the one of the active resources over which the connection is established.

20. The method of claim 19 wherein the one of the assigned protocol addresses comprising the local endpoint for each of the offloaded connections is chosen based on connection-balancing policy.

21. The method of claim 19 wherein at least one of the plurality of resources is operable as a standby and for which a virtual device has not been exported.

22. The method of claim 21 further comprising failing over to the at least one standby resource in response to the failure of one of the active resources.

23. The method of claim 22 wherein said failing over further comprises:

coupling the at least one standby resource with the virtual device exported for the failed active resource; and notifying the second set of clients that the assigned protocol address and the corresponding virtual device exported for the failed active resource is now associated with the at least one standby resource.

24. The method of claim 23 wherein said notifying further comprises broadcasting an ARP request associating the protocol address previously assigned to the failed active resource with a MAC address identifying the one of the one or more standby resources.

25. The method of claim 22 wherein said failing over further comprises:

suspending data transfer over all offloaded connections having an endpoint comprising the protocol address assigned to the failed active resource; and transferring the suspended connections and their respective connection states to the at least one standby resource.

26. The method of claim 25 wherein said failing over further comprises notifying the first set of clients that the assigned protocol address previously assigned to the failed active resource is now associated with the at least one standby resource.

27. The method of claim 26 wherein said notifying further comprises broadcasting an ARP request associating the protocol address previously assigned to the failed active resource with a MAC address identifying the one of the one or more standby resources.

28. The method of claim 19 further comprising for each of the exported virtual devices, load-balancing over the plurality of resources data transmitted to the second set of clients over conventional connections established through that exported virtual device.

29. The method of claim 28 wherein:

said load-balancing further comprises establishing a transmit load-balance (TLB) team for each of the virtual devices exported for the plurality of resources; and the active resource for which each of the virtual devices are exported acts as primary resource for each team.

30. The method of claim 28 wherein said load-balancing further comprises distributing the transmitted data among the plurality of resources on a conversation-by-conversation basis.

31. The method of claim 30 wherein said distributing further comprises assigning data frames for transmission to each of the plurality of resources based on destination protocol addresses of the frames.

32. The method of claim 30 wherein said distributing further comprises assigning data frames for transmission to each of the plurality of resources based on destination MAC addresses of the frames.

33. The method of claim 29 further comprising:

associating the virtual device exported for a failed active resource with a different one of the active resources;

notifying the second set of clients that the protocol address of the virtual device associated with the different active resource is associated with a MAC address of the different active resource; and redistributing the conversations previously assigned to the failed active resource to the remaining active resources.

34. The method of claim 29 wherein one of the active resources and its exported virtual device fail, said method further comprising redistributing the conversations previously assigned to the failed active resource to the remaining active resources of the TLB teams.

35. The method of claim 29 wherein at least one of the plurality of resources is operable to be a standby, said method further comprising:

associating the virtual device exported for a failed active resource with the at least one standby resource;

notifying the second set of clients that the protocol address of the virtual device associated with the at least one standby resource is associated with the at least one standby resource's MAC address; and redistributing the conversations previously assigned to the failed active resource to the at least one standby resource.

* * * * *